United States Patent
Hashimoto

(10) Patent No.: US 11,371,416 B2
(45) Date of Patent: Jun. 28, 2022

(54) CONTROL VALVE

(71) Applicant: DENSO CORPORATION, Kariya (JP)

(72) Inventor: Kouji Hashimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/094,072

(22) Filed: Nov. 10, 2020

(65) Prior Publication Data

US 2021/0140361 A1    May 13, 2021

(30) Foreign Application Priority Data

Nov. 12, 2019  (JP) .............................. JP2019-204847

(51) Int. Cl.
| | | |
|---|---|---|
| *F01P 7/14* | (2006.01) | |
| *F02M 26/70* | (2016.01) | |
| *F16K 15/06* | (2006.01) | |
| *F16K 11/08* | (2006.01) | |
| *F16K 17/02* | (2006.01) | |

(52) U.S. Cl.
CPC .............. *F01P 7/14* (2013.01); *F02M 26/70* (2016.02); *F16K 11/08* (2013.01); *F16K 15/06* (2013.01); *F01P 2007/146* (2013.01); *F16K 17/02* (2013.01)

(58) Field of Classification Search
CPC . F16K 5/0663; F16K 5/06; F16K 5/20; F16K 5/0605; F16K 5/12; F16K 17/02; F16K 5/0689; F16K 5/201; F16K 5/0678; F16K 31/041; F16K 11/08; F16K 11/0876; F01P 7/14; F01P 2007/146; Y10T 137/0508; F16J 15/34; F16J 15/3436; F16J 15/3452; F16J 15/3204; F16J 15/3212; F16J 15/3224
USPC ...... 251/309, 314–317, 315.01, 315.16, 359; 277/406, 379, 386
See application file for complete search history.

(56) References Cited

U.S. PATENT DOCUMENTS

| | | | | |
|---|---|---|---|---|
| 2,191,232 A | * | 2/1940 | Heinen ................. | H04L 13/188 251/174 |
| 2,558,260 A | * | 6/1951 | Maky .................. | F16K 11/0876 251/174 |
| 3,134,396 A | * | 5/1964 | Bredtschneider ....... | F16K 5/201 137/315.19 |
| 3,171,429 A | * | 3/1965 | Sturmer .................. | F16K 5/201 137/315.19 |
| 3,384,337 A | * | 5/1968 | Brown .................... | F16K 5/201 251/172 |

(Continued)

FOREIGN PATENT DOCUMENTS

| | | |
|---|---|---|
| JP | 2000-46205 | 2/2000 |
| JP | 2016-188693 | 11/2016 |

(Continued)

*Primary Examiner* — Craig J Price
(74) *Attorney, Agent, or Firm* — Nixon & Vanderhye PC

(57) ABSTRACT

A control valve includes: a port, which is shaped in a tubular form; a valve element; and a metal seal, which contacts the valve element. A gap is formed between a tubular portion of the metal seal and the port in a perpendicular direction that is perpendicular to an axial direction of a flow passage of the port. Thereby, when the valve element is displaced in the perpendicular direction, the valve element urges the metal seal to displace the metal seal in the perpendicular direction in the state where the metal seal contacts the valve element.

7 Claims, 13 Drawing Sheets

(56) References Cited

U.S. PATENT DOCUMENTS

| | | | | |
|---|---|---|---|---|
| RE26,998 E * | 12/1970 | Brown | | F16K 5/0647 |
| | | | | 251/172 |
| 4,147,327 A * | 4/1979 | Moran | | F16K 5/0668 |
| | | | | 251/172 |
| 4,217,923 A * | 8/1980 | Kindersley | | F16K 5/0636 |
| | | | | 137/315.21 |
| 4,235,418 A * | 11/1980 | Natalizia | | F16K 5/0626 |
| | | | | 251/174 |
| 4,241,895 A * | 12/1980 | Sternenberg | | F16K 1/2285 |
| | | | | 251/173 |
| 4,277,047 A * | 7/1981 | Zinnai | | F16K 1/2266 |
| | | | | 251/174 |
| 4,319,734 A * | 3/1982 | Acar | | F16K 5/201 |
| | | | | 251/174 |
| 4,428,561 A * | 1/1984 | Thompson | | F16K 5/0678 |
| | | | | 251/171 |
| 4,505,294 A * | 3/1985 | Walter | | F16K 5/201 |
| | | | | 137/240 |
| 4,593,918 A * | 6/1986 | Geissler | | F01L 7/10 |
| | | | | 123/188.6 |
| 4,750,708 A * | 6/1988 | Yusko, Jr | | F16K 5/0678 |
| | | | | 251/174 |
| 5,088,687 A * | 2/1992 | Stender | | F16K 5/0668 |
| | | | | 251/174 |
| 6,688,333 B2 | 2/2004 | McLane et al. | | |
| 8,403,296 B2 * | 3/2013 | Phillips | | F16K 3/0227 |
| | | | | 251/196 |
| 8,490,945 B2 * | 7/2013 | Keeper | | F16K 5/188 |
| | | | | 251/172 |
| 8,820,706 B2 * | 9/2014 | Kawauchi | | F16K 5/205 |
| | | | | 251/180 |
| 9,145,973 B2 * | 9/2015 | Yokoyama | | F16K 5/0663 |
| 9,267,606 B2 * | 2/2016 | Haland | | F16K 5/201 |
| 9,617,906 B2 * | 4/2017 | Lee | | F01P 7/14 |
| 9,791,053 B2 * | 10/2017 | Thomas | | F16K 5/0605 |
| 9,879,789 B2 * | 1/2018 | Webb | | F16K 5/0673 |
| 9,915,356 B2 * | 3/2018 | Chang | | F16K 3/24 |
| 10,066,751 B2 * | 9/2018 | Seko | | F16K 5/201 |
| 10,443,745 B2 * | 10/2019 | Yutani | | F16K 37/0041 |
| 10,591,069 B2 * | 3/2020 | Russalian | | F16K 5/201 |
| 10,648,577 B2 * | 5/2020 | Ozeki | | F01P 3/20 |
| 10,794,488 B2 * | 10/2020 | Yagi | | F16K 5/06 |
| 11,079,028 B2 * | 8/2021 | Hashimoto | | F16K 11/0876 |
| 11,098,807 B2 * | 8/2021 | Suzuki | | F16K 11/0856 |
| 11,105,430 B2 * | 8/2021 | Ozeki | | F16K 5/0464 |
| 11,149,627 B2 * | 10/2021 | Sano | | F01P 7/14 |
| 11,149,869 B2 * | 10/2021 | England | | F16J 15/025 |
| 2006/0231786 A1 * | 10/2006 | Witt | | F16K 1/2266 |
| | | | | 251/174 |
| 2015/0075658 A1 | 3/2015 | Tsuchiya et al. | | |
| 2015/0122359 A1 | 5/2015 | Tsuchiya et al. | | |
| 2015/0285143 A1 * | 10/2015 | Pollock | | F02C 9/18 |
| | | | | 251/315.01 |
| 2016/0319940 A1 * | 11/2016 | Funato | | F16K 5/06 |
| 2017/0009894 A1 | 1/2017 | Seko et al. | | |
| 2017/0335750 A1 | 11/2017 | Yumisashi et al. | | |
| 2018/0009194 A1 | 1/2018 | Sekine et al. | | |
| 2018/0045321 A1 * | 2/2018 | Seo | | F16K 27/067 |
| 2018/0119836 A1 | 5/2018 | Ozeki et al. | | |
| 2018/0149073 A1 | 5/2018 | Shen et al. | | |
| 2018/0335153 A1 | 11/2018 | Ozeki et al. | | |
| 2018/0340618 A1 | 11/2018 | Seko et al. | | |
| 2019/0186641 A1 | 6/2019 | Seko et al. | | |
| 2019/0211738 A1 | 7/2019 | Yoshimura et al. | | |
| 2020/0292081 A1 * | 9/2020 | Nakayama | | F16K 5/201 |

FOREIGN PATENT DOCUMENTS

| | | | | |
|---|---|---|---|---|
| JP | | 2017-20424 | 1/2017 | |
| JP | | 2017-067079 | 4/2017 | |
| WO | WO-2016007127 A1 * | | 1/2016 | F16K 5/0668 |

\* cited by examiner

50B

50B

CONTROL VALVE

CROSS REFERENCE TO RELATED APPLICATION

This application is based on and incorporates herein by reference Japanese Patent Application No. 2019-204847 filed on Nov. 12, 2019.

TECHNICAL FIELD

The present disclosure relates to a control valve.

BACKGROUND

Previously, there is proposed a valve mechanism that includes: a flow passage that is formed in an inside of a valve housing and conducts coolant in an axial direction; and a valve element that is configured to open and close the flow passage while a metal seal, which slidably contacts the valve element, is placed at the inside of the valve housing.

SUMMARY

According to the present disclosure, there is provided a control valve that includes a flow passage forming portion, a valve element and a seal. The seal contacts the valve element. A gap is formed between the seal and the flow passage forming portion in a crossing direction, which crosses an axial direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
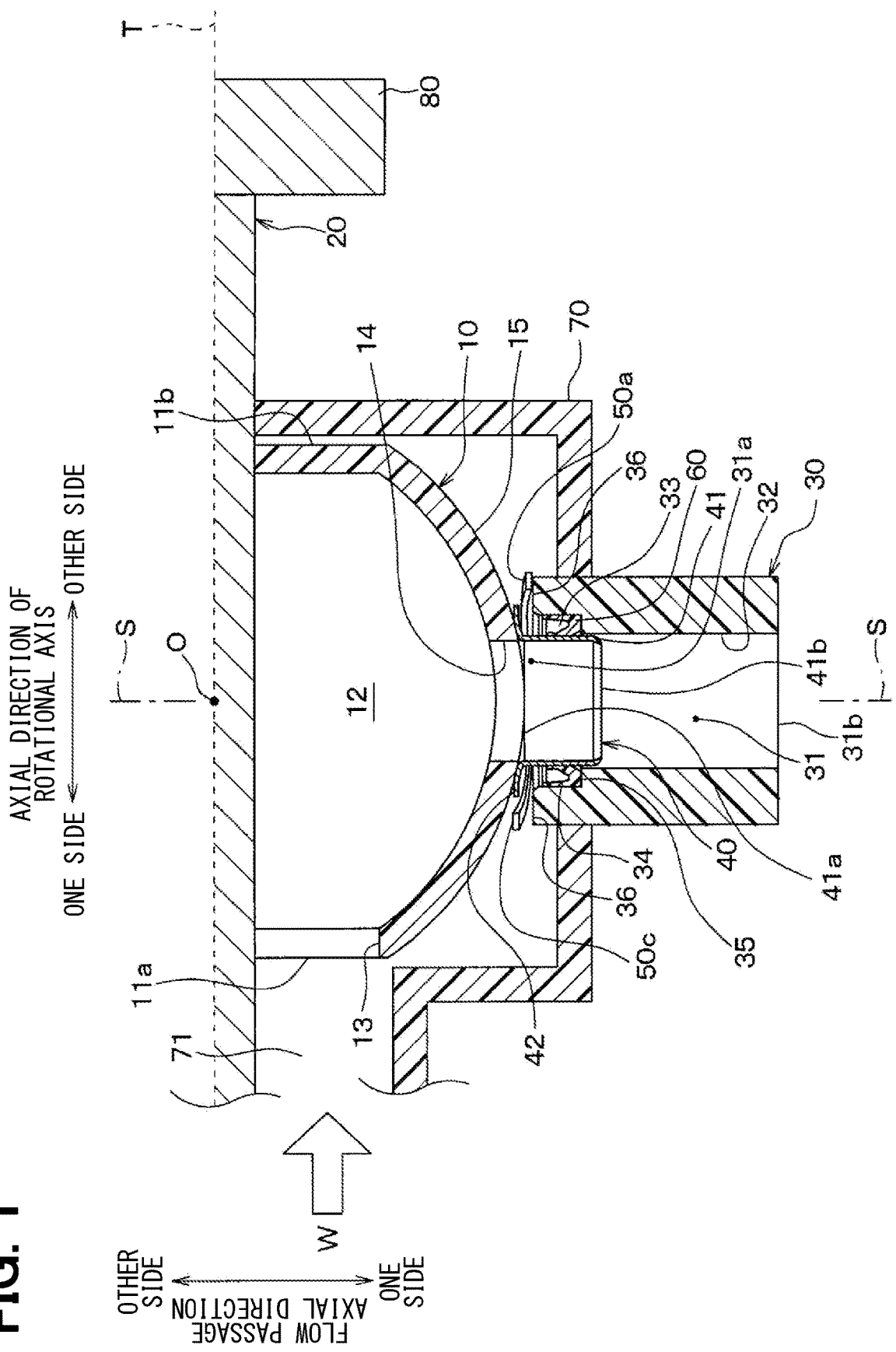
FIG. 1 is a cross-sectional view showing a lower half of a control valve, which is located on a lower side of a rotational axis T, according to a first embodiment of the present disclosure, indicating a state where an outlet of a valve element and an inlet of a port are communicated with each other.

Previously, there is proposed a valve mechanism that includes: a flow passage that is formed in an inside of a valve housing and conducts coolant in an axial direction; and a valve element that is configured to open and close the flow passage while a metal seal, which slidably contacts the valve element, is placed at the inside of the valve housing.

In this valve mechanism, a flexible support is provided to the metal seal, so that the metal seal can be urged against the valve housing with an appropriate pressure by a resilient force of the flexible support.

In addition, the valve mechanism has a structure that enables adjustment of a position of the metal seal in the axial direction. Therefore, appropriate sealing performance of the metal seal relative to the valve element can be ensured by adjusting the positional relationship between the valve element and the metal seal in the axial direction.

In the above-described valve mechanism, although the positional relationship between the valve element and the metal seal can be adjusted in the axial direction, the position of the metal seal in another direction, which is other than the axial direction, cannot be adjusted, and thereby, appropriate sealing performance of the metal seal (serving as a seal) relative to the valve element cannot be ensured.

According to the present disclosure, there is provided a control valve including:

a flow passage forming portion that is shaped in a tubular form and forms a flow passage while the flow passage is configured to conduct fluid in an axial direction of a central axis of the flow passage forming portion, wherein the flow passage forming portion forms an opening of the flow passage that opens in the axial direction;

a valve element that is placed relative to the flow passage forming portion in the axial direction, wherein the valve element is configured to open and close the opening of the flow passage forming portion through rotation of the valve element; and a seal that contacts the valve element, wherein a gap is formed between the seal and the flow passage forming portion in a crossing direction, which crosses the axial direction, to enable displacement of the seal in the crossing direction in a state where the seal contacts the valve element.

According to the control valve of the present disclosure, when the valve element is displaced in the crossing direction to urge the seal, the seal can be displaced in the crossing direction in the state where the seal contacts the valve element. Thus, it is possible to ensure the appropriate sealing performance of the seal relative to the valve element when the valve element is displaced in the crossing direction.

Hereinafter, various embodiments of the present disclosure will be described with reference to the drawings. In each of the following embodiments, the same or equivalent portions are denoted by the same reference numerals in the drawings in order to simplify the description.

First Embodiment

A control valve of a first embodiment will be described with reference to FIGS. 1 to 5. An arrow W in FIGS. 1 and 2 indicates a flow direction of engine coolant.

Figure 2:
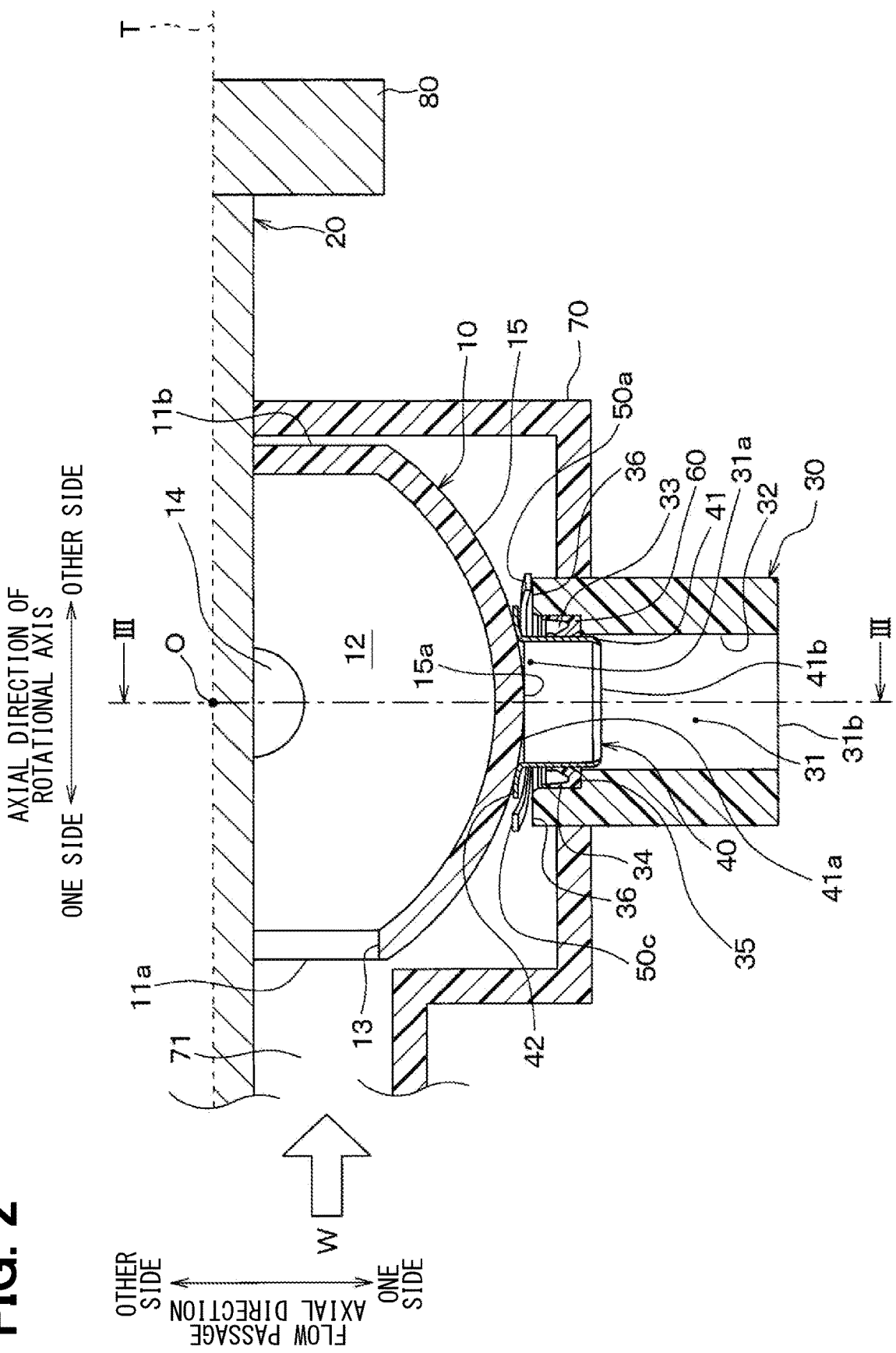
FIG. 2 is a cross-sectional view showing the lower half of the control valve, which is located on the lower side of the rotational axis T, according to the first embodiment, indicating a state where the valve element closes the inlet of the port.

The control valve of the present embodiment is a valve that opens and closes an engine coolant circuit of a vehicle. As shown in FIGS. 1 and 2, the control valve includes a valve element 10, a shaft 20, a port (serving as a flow passage forming portion) 30, a metal seal 40, flexible supports 50a, 50b, 50c, a packing 60, a casing 70 and a drive device 80.

An outer wall 15 of the valve element 10 is shaped substantially in a spherical form. The valve element 10 is rotatable about a rotational axis T, which serves as a central axis. The rotational axis T is an imaginary axis (an imaginary line) that passes through a center point o of the valve element 10. The outer wall 15 of the valve element 10 has two planar portions 11a, 11b, which are respectively located on one side and the other side in the axial direction of the rotational axis T.

Each of the planar portions 11a, 11b is formed in a planar form that is perpendicular to the rotational axis T. An opening 13 is formed in the planar portion 11a. The opening 13 forms an inlet of a coolant flow passage 12. The coolant flow passage 12 is formed at an inside of the valve element 10.

An opening 14 is formed through a portion of the outer wall 15 of the valve element 10, which is located on one side in a flow passage axial direction. The opening 14 forms an outlet of the coolant flow passage 12. The flow passage axial direction is an axial direction of a flow passage axis S that is an imaginary axis (an imaginary line), which passes through the center point o of the valve element 10 and is perpendicular to the rotational axis T. The flow passage axis S coincides with a central axis of the port 30. The valve element 10 of the present embodiment is made of a resin material or a metal material.

The shaft 20 is a shaft member that is shaped in a cylindrical rod form, which extends in the axial direction of the rotational axis T. A central axis of the shaft 20 coincides with the rotational axis T, and the shaft 20 supports the valve element 10. A portion of the shaft 20, which is located on the other side in the axial direction of the rotational axis T, projects from an inside to an outside of the casing 70. The shaft 20 is rotatably supported about the rotational axis T, which serves as the central axis of the shaft 20. The shaft 20 of the present embodiment is made of a resin material or a metal material.

The port 30 is located on the one side of the valve element 10 in the flow passage axial direction. The port 30 is shaped in a cylindrical tubular form and forms a coolant flow passage 31. The coolant flow passage 31 is a flow passage that conducts the engine coolant (serving as fluid) in the flow passage axial direction (i.e., the axial direction of the flow passage 31). The coolant flow passage 31 is formed by an inner peripheral surface 32 of the port 30.

The port 30 has an opening 31a, which is located on the other side of the port 30 in the flow passage axial direction.

The opening 31a forms an inlet of the coolant flow passage 31. The port 30 has an opening 31b, which is located on the one side of the port 30 in the flow passage axial direction. The opening 31b forms an outlet of the coolant flow passage 31.

The port 30 of the present embodiment has an inner peripheral surface 34 and a bottom surface 35, which form a recess 33. The recess 33 is recessed from the inner peripheral surface 32 toward an outer side in a radial direction about the flow passage axis S. The recess 33 is formed at an end part of the port 30, which is located on the other side in the flow passage axial direction.

Thereby, the recess 33 opens to each of the coolant flow passage 31 and a space located on the other side of the port 30 in the flow passage axial direction.

The inner peripheral surface 34 is located at the outer side of the recess 33 in the radial direction about the flow passage axis S. The inner peripheral surface 34 extends in a circumferential direction about the flow passage axis S, which serves as the central axis. The bottom surface 35 is located at the one side of the recess 33 in the flow passage axial direction. The bottom surface 35 extends in the circumferential direction about the flow passage axis S, which serves as the central axis. The port 30 of the present embodiment is made of a resin material or a metal material.

The metal seal 40 is a seal that includes a tubular portion 41 and a flange 42. The tubular portion 41 is shaped in a cylindrical tubular form that is coaxial with the flow passage axis S. The tubular portion 41 is located on an inner side of the inner peripheral surface 32 of the port 30 in the radial direction about the flow passage axis S.

The tubular portion 41 extends along the inner peripheral surface 32 of the port 30. The tubular portion 41 is located at the end part of the port 30, which is located on the other side in the flow passage axial direction. Two openings 41a, 41b are formed at two opposite end parts of the tubular portion 41, which are respectively located on the one side and the other side in the flow passage axial direction.

In the present embodiment, a gap 90, which will be described later, is formed between the tubular portion 41 of the metal seal 40 and the inner peripheral surface 32 of the port 30.

The flange 42 extends outward in the radial direction about the flow passage axis S from the end part of the tubular portion 41, which is located on the other side in the flow passage axial direction. The flange 42 is shaped in a circular ring form that extends in the circumferential direction about the flow passage axis S, which serves as the central axis.

Across section of the flange 42 of the present embodiment, which is taken along a plane that includes the flow passage axis S and the rotational axis T, is shaped in a curved form that is convex toward the other side in the flow passage axial direction. The flange 42 contacts the outer wall 15 of the valve element 10 to secure appropriate sealing performance relative to the valve element 10.

Figure 5:
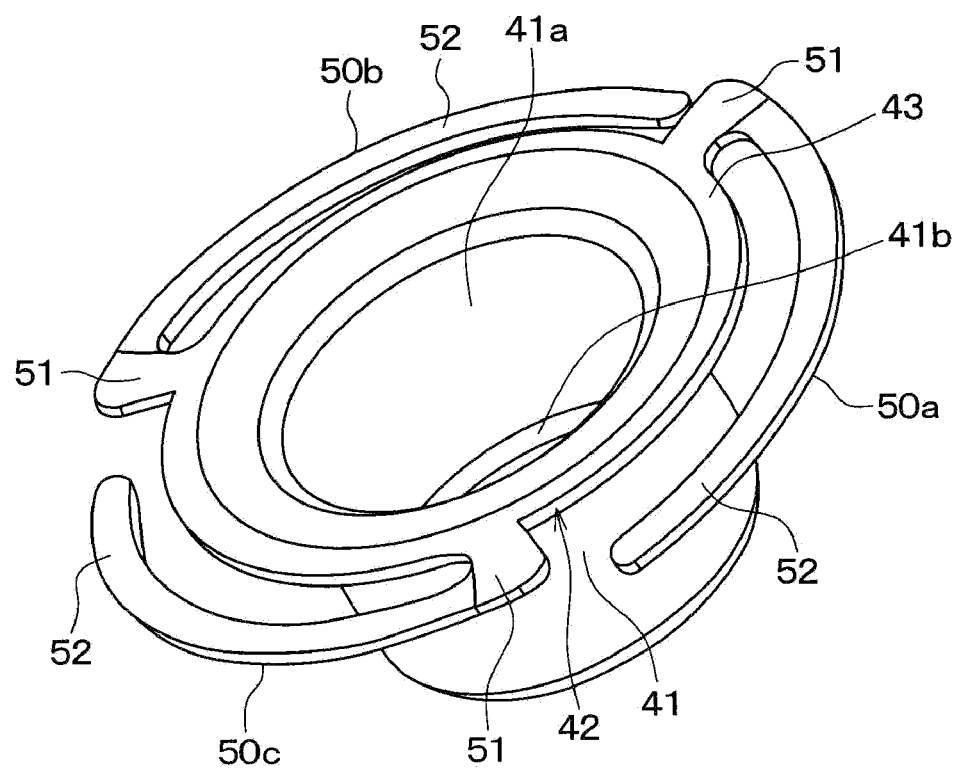
FIG. 5 is a perspective view of a metal seal of the control valve according to the first embodiment.

As shown in FIG. 5, the flexible supports 50a, 50b, 50c are located on an outer side of the flange 42 in the radial direction about the flow passage axis S. The flexible supports 50a, 50b, 50c are arranged at equal intervals in the circumferential direction about the flow passage axis S.

Each of the flexible supports 50a, 50b, 50c includes: a projection 51, which projects outward in the radial direction from the flange 42; and an extension 52, which is in a form of a band (a form of an arcuate plate) and extends from a distal end of the projection 51 in the circumferential direction about the flow passage axis S.

The extension 52 is formed such that the extension 52 progressively projects toward the one side in the flow passage axial direction as the extension 52 extends further away from the distal end of the projection 51 in the circumferential direction. A circumferential distal end side of the extension 52 is supported by an end surface 36 of the port 30.

The flexible supports 50a, 50b, 50c respectively exert a resilient force against the metal seal 40. Therefore, the flexible supports 50a, 50b, 50c respectively exert the resilient force against the valve element 10 through the metal seal 40.

Figure 4:
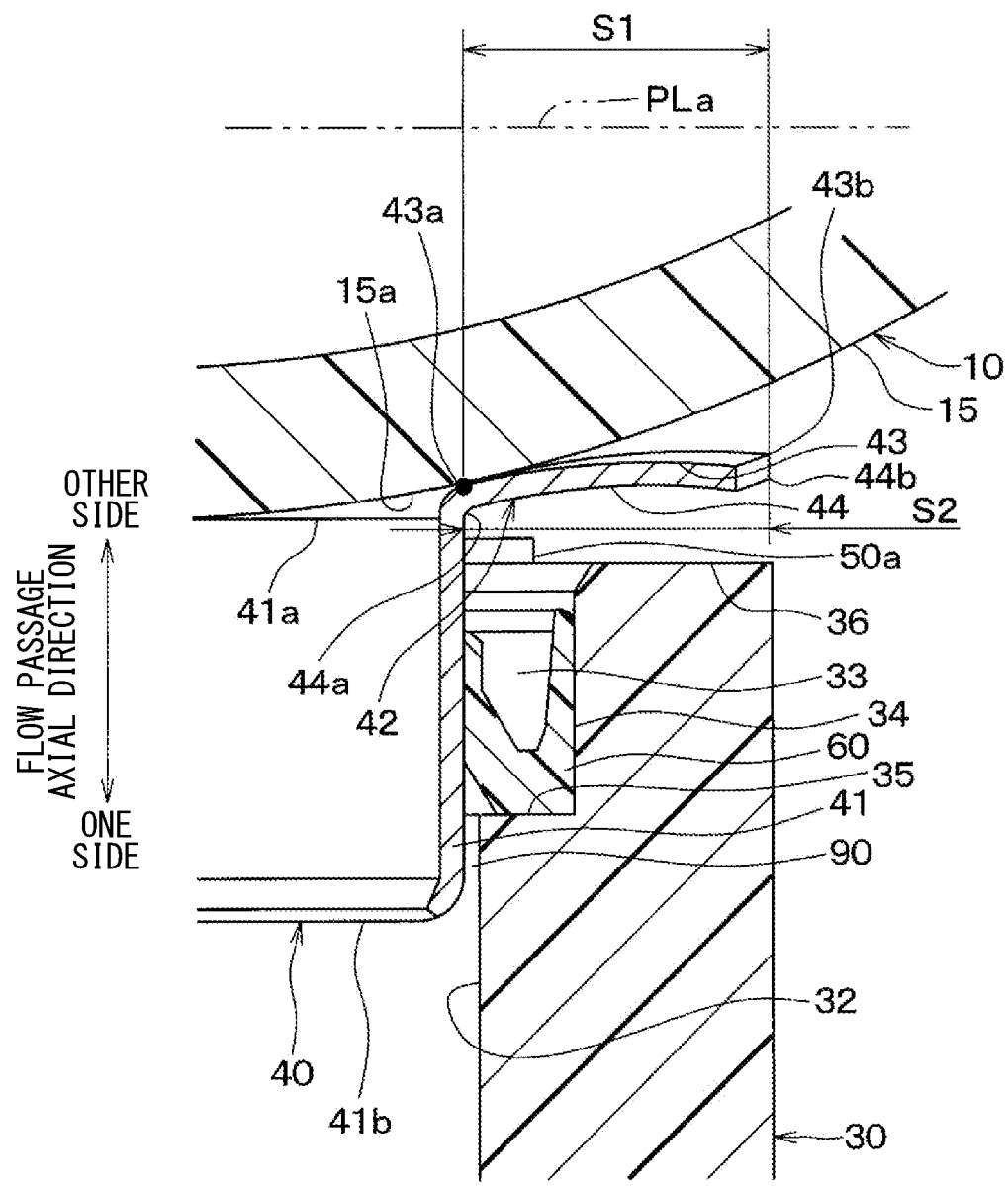
FIG. 4 is an enlarged view of a portion IV in FIG. 3.

In the present embodiment, as shown in FIG. 4, a pressure receiving area of a second pressure receiving region 43 of the metal seal 40, which receives a pressure (i.e., a fluid pressure) of the engine coolant from the other side in the flow passage axial direction, is defined as a pressure receiving area S1.

An imaginary plane, which is located on the other side of the metal seal 40 in the flow passage axial direction and is perpendicular to the flow passage axis S, is defined as an imaginary plane PLa. A region of the flange 42, which is located on the other side in the flow passage axial direction, is defined as a front surface. A region of the flange 42, which is located on the one side in the flow passage axial direction, is defined as a back surface.

The second pressure receiving region 43 is a region of the front surface of the flange 42 that is shaped in a circular ring form and is located between: a contact part 43a of the front surface of the flange 42, which contacts the valve element 10; and a radially outer end part 43b of the front surface of the flange 42. The pressure receiving area S1 of the second pressure receiving region 43 is an area (surface area) of a two-dimensional projected image that is produced by projecting the second pressure receiving region 43 onto the imaginary plane PLa from the one side in the flow passage axial direction.

Furthermore, a pressure receiving area of a first pressure receiving region 44 of the metal seal 40, which receives a pressure (i.e., a fluid pressure) of the engine coolant from the one side in the flow passage axial direction, is defined as a pressure receiving area S2.

The first pressure receiving region 44 is a region of the back surface of the flange 42 that is located between a radially inner end part 44a and a radially outer end part 44b of the back surface of the flange 42. The pressure receiving area S2 of the first pressure receiving region 44 is an area (surface area) of a two-dimensional projected image that is shaped in a circular ring form and is produced by projecting the first pressure receiving region 44 onto the imaginary plane PLa from the one side in the flow passage axial direction.

In the present embodiment configured in the above-described manner, the pressure receiving area S1 of the second pressure receiving region 43 is the same size as the pressure receiving area S2 of the first pressure receiving region 44.

The metal seal 40 and the flexible supports 50a, 50b, 50c of the present embodiment are made of a metal material and are formed together in one-piece. An end surface 36 of the port 30 is located on the one side of the port 30 in the flow passage axial direction. The end surface 36 is located on the outer side of the recess 33 in the radial direction about the flow passage axis S and extends in the circumferential direction.

The packing 60 is made of an elastic member (elastomer), such as rubber, and is placed between the inner peripheral surface 34 of the port 30 and the tubular portion 41 of the metal seal 40. The packing 60 is supported by the bottom surface 35 of the port 30. The packing 60 is shaped in a ring form and extends in the circumferential direction about the flow passage axis S, which serves as the central axis.

The packing 60 is clamped between the inner peripheral surface 34 of the port 30 and the tubular portion 41 of the metal seal 40 in a state where the packing 60 is compressed in a perpendicular direction that is perpendicular to the flow passage axial direction through resilient deformation of the packing 60. The perpendicular direction, which is perpendicular to the flow passage axial direction, is a crossing direction that crosses (e.g., perpendicularly crosses) the flow passage axial direction (i.e., the axial direction of the flow passage forming portion).

The packing 60 closely contacts the inner peripheral surface 34 of the port 30 and closely contacts the tubular portion 41 of the metal seal 40 in the state where the packing 60 is compressed through resilient deformation of the packing 60. The packing 60 of the present embodiment is made of, for example, the rubber and is shaped to have a V-shape in a cross section of the packing 60. In other words, the packing 60 has a groove that is recessed at the packing 60 from the other side toward the one side in the flow passage axial direction.

The casing 70 is formed such that the casing 70 surrounds the valve element 10 and the shaft 20 together with the port 30. The casing 70 forms a coolant passage 71 that is communicated with the coolant flow passage 12 in the valve element 10.

The drive device 80 is placed on the other side of the shaft 20 in the axial direction of the rotational axis T. The drive device 80 rotates the shaft 20 about the rotational axis T, which serves as the central axis, to rotate the valve element 10 about the rotational axis T. The drive device 80 of the present embodiment includes an electric motor that rotates the shaft 20 about the rotational axis T.

Figure 3:
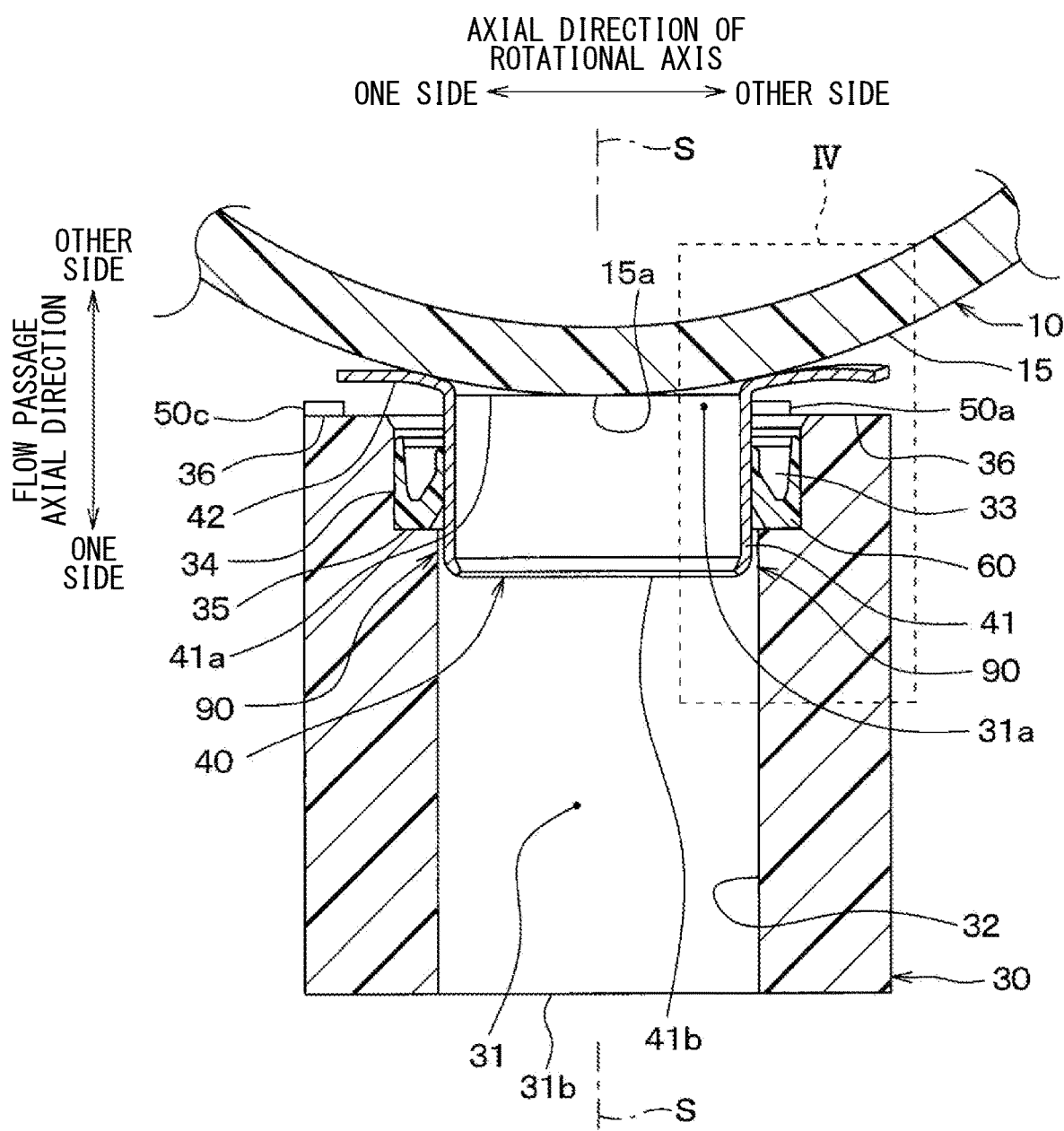
FIG. 3 is a cross-sectional view taken along line III-III in FIG. 2, showing a metal seal and its periphery in a magnified scale.

The gap 90 of the present embodiment, which is formed between the tubular portion 41 of the metal seal 40 and the inner peripheral surface 32 of the port 30, will be described with reference to FIGS. 3 and 4.

The gap 90 is located between the tubular portion 41 of the metal seal 40 and the inner peripheral surface 32 of the port 30 in the perpendicular direction that is perpendicular to the flow passage axial direction. The gap 90 is located on the one side of the recess 33 in the flow passage axial direction and extends in the flow passage axial direction. The gap 90 extends in the circumferential direction all around about the flow passage axis S, which serves as the central axis.

The gap 90 of the present embodiment enables displacement of the metal seal 40 in the radial direction about the flow passage axis S.

Next, the operation of the control valve of the present embodiment will be described.

First of all, as shown in FIG. 1, in a state where the opening 14 of the valve element 10 is communicated with the opening 31a of the port 30, the engine coolant, which flows in the coolant passage 71, flows into the coolant flow passage 12 through the opening 13 of the valve element 10.

The engine coolant, which enters the coolant flow passage 12, flows to the opening 31b of the port 30 through the opening 14 of the valve element 10, the opening 31a of the port 30 and the openings 41a, 41b of the metal seal 40.

At this time, the packing 60 is clamped between the inner peripheral surface 34 of the port 30 and the tubular portion 41 of the metal seal 40 in the state where the packing 60 is compressed through resiliently deformation of the packing 60. Thereby, the metal seal 40 is supported by the port 30 through the packing 60.

At this time, the packing 60 closely contacts the inner peripheral surface 34 of the port 30 and closely contacts the tubular portion 41 of the metal seal 40. Thereby, the packing 60 seals between the inner peripheral surface 34 of the port 30 and the tubular portion 41 of the metal seal 40.

Specifically, the appropriate sealing performance between the inner peripheral surface 34 of the port 30 and the tubular portion 41 of the metal seal 40 can be ensured by the packing 60.

The metal seal 40 is supported by the end surface 36 of the port 30 through the flexible supports 50a, 50b, 50c.

At this time, the metal seal 40 is supported in the state where the flexible supports 50a, 50b, 50c are compressed in the flow passage axial direction through resilient deformation of the flexible supports 50a, 50b, 50c. Therefore, the resilient force of each of the flexible supports 50a, 50b, 50c is exerted to the outer wall 15 of the valve element 10 through the metal seal 40.

Thus, the close contact between the metal seal 40 and the outer wall 15 of the valve element 10 can be ensured. Specifically, the appropriate sealing performance of the metal seal 40 relative to the valve element 10 can be ensured.

Thereafter, when the drive device 80 rotates the valve element 10 about the rotational axis T through the shaft 20, the opening 31a of the port 30 is closed by a portion of the outer wall 15 of the valve element 10, which is other than the opening 13 and the opening 14.

Hereinafter, the portion of the outer wall 15 of the valve element 10, which is other than the opening 13 and the opening 14, will be referred to as a closure portion 15a. The closure portion 15a is formed such that the closure portion 15a covers the coolant flow passage 12 from the outer side in the radial direction about the center O.

For example, when the valve element 10 is displaced toward the one side in the flow passage axial direction, the metal seal 40 is displaced by the valve element 10 toward the one side in the flow passage axial direction. In response to this displacement, a force is applied from the metal seal 40 to the flexible supports 50a, 50b, 50c.

Therefore, the flexible supports 50a, 50b, 50c are resiliently deformed in the flow passage axial direction in the state where the flange 42 of the metal seal 40 closely contacts the closure portion 15a of the valve element 10, and the packing 60 seals between the port 30 and the metal seal 40.

Furthermore, the valve element 10 may be displaced toward the other side in the flow passage axial direction. In such a case, the flexible supports 50a, 50b, 50c expand through resilient deformation of the flexible supports 50a, 50b, 50c. Thus, the resilient force is applied from the flexible supports 50a, 50b, 50c to the metal seal 40. Thus, the metal seal 40 is displaced toward the other side in the flow passage axial direction.

Thus, even when the valve element 10 is displaced toward the other side in the flow passage axial direction, it is possible to maintain the state where the flange 42 of the metal seal 40 closely contacts the closure portion 15a of the valve element 10 while the packing 60 seals between the port 30 and the metal seal 40.

When the valve element 10 is displaced in the flow passage axial direction in the above-described manner, the flexible supports 50a, 50b, 50c are resiliently deformed, so that the metal seal 40 closely contacts the closure portion 15a of the valve element 10, and the packing 60 seals between the port 30 and the metal seal 40.

For example, the valve element 10 is displaced toward the one side in the perpendicular direction that is perpendicular to the flow passage axial direction. In response to this displacement, a force is applied from the valve element 10 to the metal seal 40 toward the one side in the perpendicular direction that is perpendicular to the flow passage axial direction.

As discussed above, the gap 90 is formed between the tubular portion 41 of the metal seal 40 and the inner peripheral surface 32 of the port 30. Therefore, the metal seal 40 is displaced toward the one side in the perpendicular direction that is perpendicular to the flow passage axial direction in the state where the flange 42 of the metal seal 40 closely contacts the closure portion 15a of the valve element 10.

Thus, a force is applied from the tubular portion 41 of the metal seal 40 to the packing 60 toward the one side in the perpendicular direction that is perpendicular to the flow passage axial direction. As a result, a portion of the packing 60, which is located on the one side of the metal seal 40 in the axial direction of the rotational axis T, is compressed through resilient deformation of this portion of the packing 60. In contrast, a portion of the packing 60, which is located on the other side of the metal seal 40 in the axial direction of the rotational axis T, expands through resilient deformation of this portion of the packing 60.

Therefore, the metal seal 40 is displaced toward the one side in the perpendicular direction that is perpendicular to the flow passage axial direction in the state where the flange 42 of the metal seal 40 closely contacts the closure portion 15a of the valve element 10 while the packing 60 seals between the inner peripheral surface 34 of the port 30 and the tubular portion 41 of the metal seal 40.

Thereafter, the valve element 10 may be displaced toward the other side in the perpendicular direction that is perpendicular to the flow passage axial direction. In response to this displacement of the valve element 10, a force is applied from the valve element 10 to the metal seal 40 toward the other side in the perpendicular direction that is perpendicular to the flow passage axial direction.

As discussed above, the gap 90 is formed between the tubular portion 41 of the metal seal 40 and the inner peripheral surface 32 of the port 30. Therefore, the metal seal 40 is displaced toward the other side in the perpendicular direction that is perpendicular to the flow passage axial direction in the state where the flange 42 of the metal seal 40 closely contacts the closure portion 15a of the valve element 10.

Thus, a force is applied from the tubular portion 41 of the metal seal 40 to the packing 60 toward the other side in the perpendicular direction that is perpendicular to the flow passage axial direction. As a result, the portion of the packing 60, which is located on the other side of the metal seal 40 in the axial direction of the rotational axis T, is compressed through resilient deformation of this portion of the packing 60. In contrast, the portion of the packing 60, which is located on the one side of the metal seal 40 in the axial direction of the rotational axis T, expands through resilient deformation of this portion of the packing 60.

Therefore, the metal seal 40 is displaced toward the other side in the perpendicular direction that is perpendicular to the flow passage axial direction in the state where the flange 42 of the metal seal 40 closely contacts the closure portion 15a of the valve element 10 while the packing 60 seals between the inner peripheral surface 34 of the port 30 and the tubular portion 41 of the metal seal 40.

When the valve element 10 is displaced in the perpendicular direction that is perpendicular to the flow passage axial direction, or when the valve element 10 is displaced in the flow passage axial direction, the metal seal 40 is urged by the valve element 10 and is thereby displaced in the perpendicular direction that is perpendicular to the flow passage axial direction or is displaced in the flow passage axial direction.

Thus, even when the metal seal 40 is urged by the valve element 10, the appropriate sealing performance of the metal seal 40 relative to the valve element 10 can be ensured, and the appropriate sealing performance between the inner peripheral surface 34 of the port 30 and the tubular portion 41 of the metal seal 40 can be ensured by the packing 60.

According to the present embodiment discussed above, the control valve includes the port 30 that is shaped in the tubular form about the flow passage axis S while the port 30 forms the coolant flow passage 31 that conducts the engine coolant from the other side toward the one side in the flow passage axial direction. The port 30 forms the opening 31a of the coolant flow passage 31 on the other side in the flow passage axial direction. The flow passage axial direction is the axial direction of the flow passage axis S.

The control valve includes: the valve element 10, which is placed on the other side of the port 30 in the flow passage axial direction and opens and closes the opening 31a through the rotation of the valve element 10; and the metal seal 40, which contacts the valve element 10.

In the control valve, the gap 90 is formed between the tubular portion 41 of the metal seal 40 and the port 30 in the perpendicular direction that is perpendicular to the flow passage axial direction. Thereby, when the valve element 10 is displaced in the perpendicular direction that is perpendicular to the flow passage axial direction, the valve element 10 urges the metal seal 40 to displace the metal seal 40 in the perpendicular direction that is perpendicular to the flow passage axial direction in the state where the metal seal 40 contacts the valve element 10.

Thus, the metal seal 40 is urged by the valve element 10 in the state where the metal seal 40 contacts the valve element 10, so that the metal seal 40 is displaced in the perpendicular direction that is perpendicular to the flow passage axial direction. Therefore, even when the metal seal 40 is displaced in the perpendicular direction that is perpendicular to the flow passage axial direction, it is possible to maintain the contact state of the metal seal 40 where the metal seal 40 contacts the valve element 10.

In the present embodiment, the flexible supports 50a, 50b, 50c are supported by the end surface 36 of the port 30 and exerts the resilient force to urge the metal seal 40 against the valve element 10. Thus, the appropriate sealing performance of the metal seal 40 relative to the valve element 10 can be improved.

In the present embodiment, the pressure receiving area of the first pressure receiving region 44 of the metal seal 40, which receives the pressure of the engine coolant from the one side in the flow passage axial direction, is defined as the pressure receiving area S2. The pressure receiving area of the second pressure receiving region 43 of the metal seal 40, which receives the pressure of the engine coolant from the other side in the flow passage axial direction, is defined as the pressure receiving area S1.

Here, the pressure receiving area S1 is the same size as the pressure receiving area S2. Therefore, in the state where the valve element 10 closes the opening 31a of the port 30, the fluid pressure, which is received by the metal seal 40 from the one side in the flow passage axial direction, and the fluid pressure, which is received by the metal seal 40 from the other side in the flow passage axial direction, can be canceled with each other.

Second Embodiment

In the first embodiment, there is described the example where the flexible supports 50a, 50b, 50c, which are directly supported by the end surface 36 of the port 30, are used.

Alternatively, in a second embodiment, with reference to FIGS. 6 and 7, there will be described another example where a flexible support 50 is supported relative to the end surface 36 of the port 30 through a ring 100. An arrow W in FIGS. 6 and 7 indicates a flow direction of the engine coolant.

Figure 6:
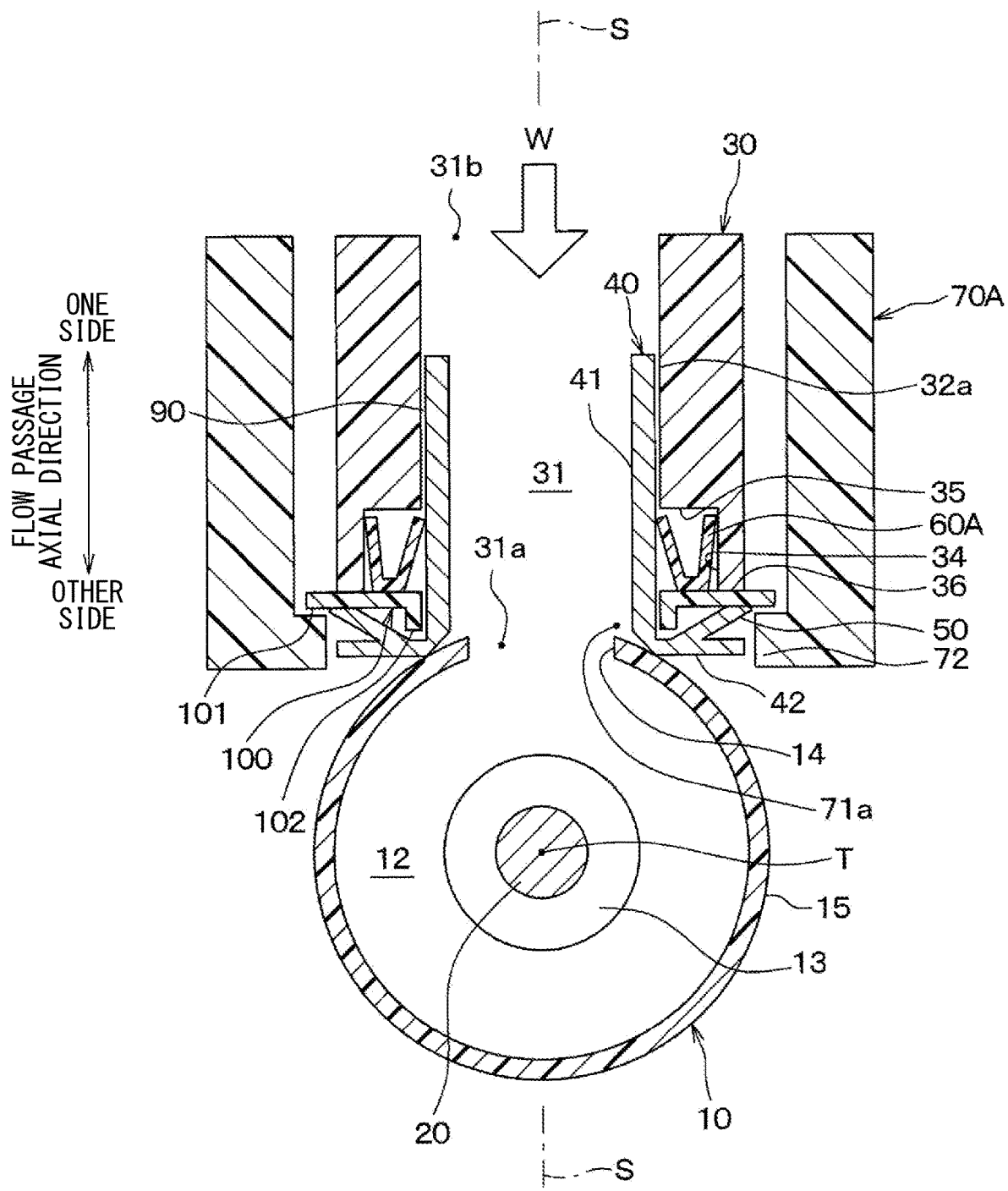
FIG. 6 is a cross-sectional view showing an overall configuration of a control valve according to a second embodiment, indicating a state where an inlet of a valve element and an outlet of a port are communicated with each other.
Figure 7:
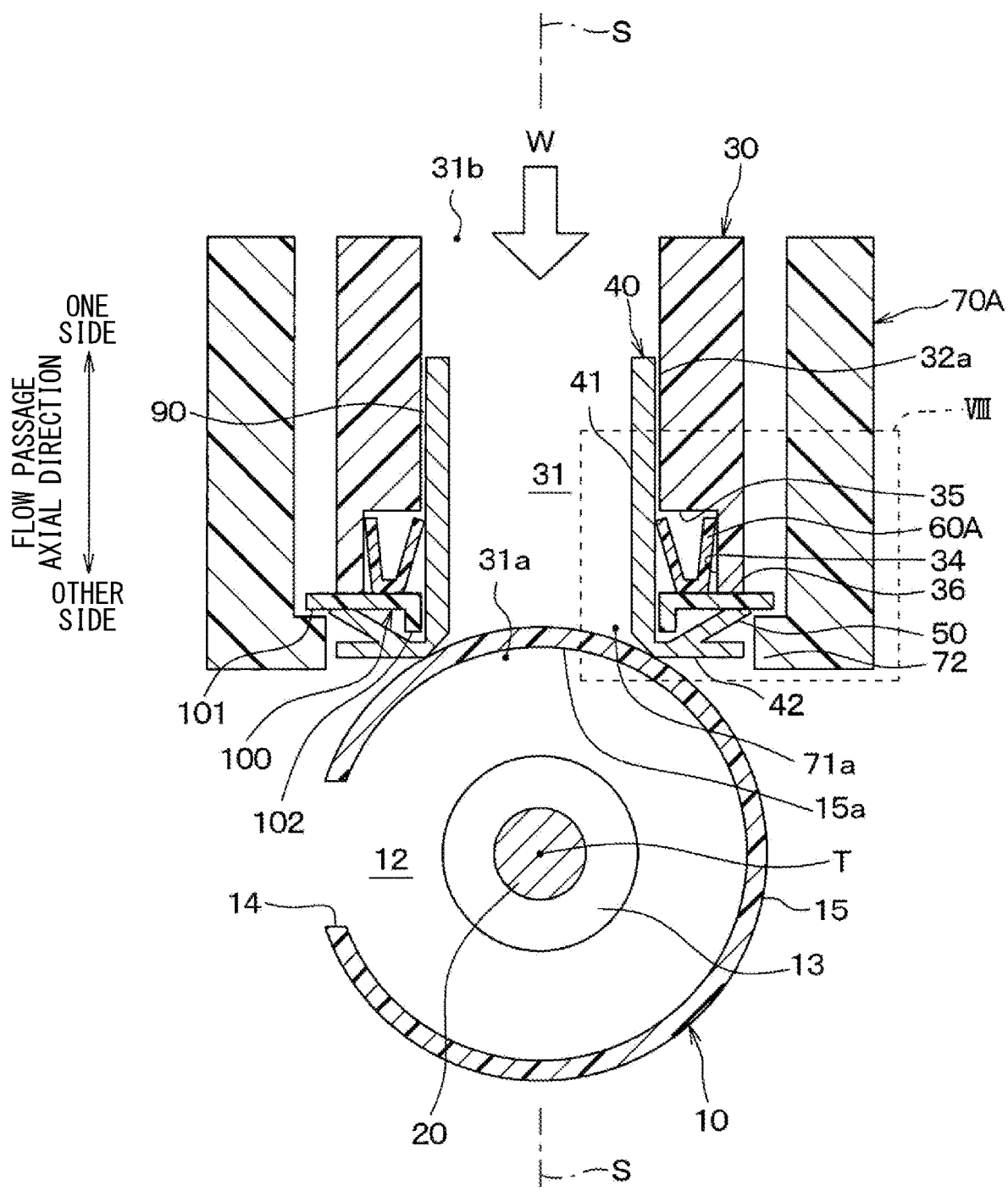
FIG. 7 is a cross-sectional view showing the overall configuration of the control valve according to the second embodiment, indicating a state where the valve element closes the outlet of the port.

As shown in FIGS. 6 and 7, the control valve includes the valve element 10, the shaft 20, the port 30, the metal seal 40, the flexible support 50, a packing 60A, a port case 70A, the casing 70, the drive device 80 and the ring 100. In FIGS. 6 and 7, indication of the casing 70 and the drive device 80 are omitted for the sake of simplicity.

Like the valve element 10 of the first embodiment, the valve element 10 of the present embodiment is shaped substantially in a spherical form and is rotatable about the rotational axis T, which serves as the central axis. The opening 14 of the valve element 10 forms an inlet of the coolant flow passage 12. The opening 13 of the valve element 10 forms an outlet of the coolant flow passage 12.

Like the shaft 20 of the first embodiment, the shaft 20 is the shaft member that is shaped in the cylindrical rod form, which extends in the axial direction of the rotational axis T. The axis of the shaft 20 coincides with the rotational axis T, and the shaft 20 supports the valve element 10.

Like the port 30 of the first embodiment, the port 30 of the present embodiment is shaped in the cylindrical tubular form that forms the coolant flow passage 31. Like the metal seal 40 of the first embodiment, the metal seal 40 of the present embodiment includes the tubular portion 41 and the flange 42.

The opening 31a of the port 30 of the present embodiment forms an outlet of the coolant flow passage 31. The opening 31b of the port 30 forms an inlet of the coolant flow passage 31.

Like the first embodiment, in the present embodiment, the gap 90 is formed between the tubular portion 41 of the metal seal 40 and the inner peripheral surface 32a of the port 30. The gap 90 is also formed between the tubular portion 41 of the metal seal 40 and the ring 100. The gap 90 extends in the circumferential direction about the flow passage axis S, which serves as the central axis.

The flexible support 50 of the present embodiment is provided in place of the flexible supports 50a, 50b, 50c of the first embodiment. The flexible support 50 is placed between the ring 100 and the flange 42 of the metal seal 40.

The flexible support 50 is shaped in a ring form about the flow passage axis S, which serves as the central axis. The flexible support 50 is made of a metal material. The flexible support 50 is sloped such that the flexible support 50 progressively projects toward the one side in the flow passage axial direction as the flexible support 50 extends from the inner side toward the outer side in the radial direction about the flow passage axis S.

Figure 8:
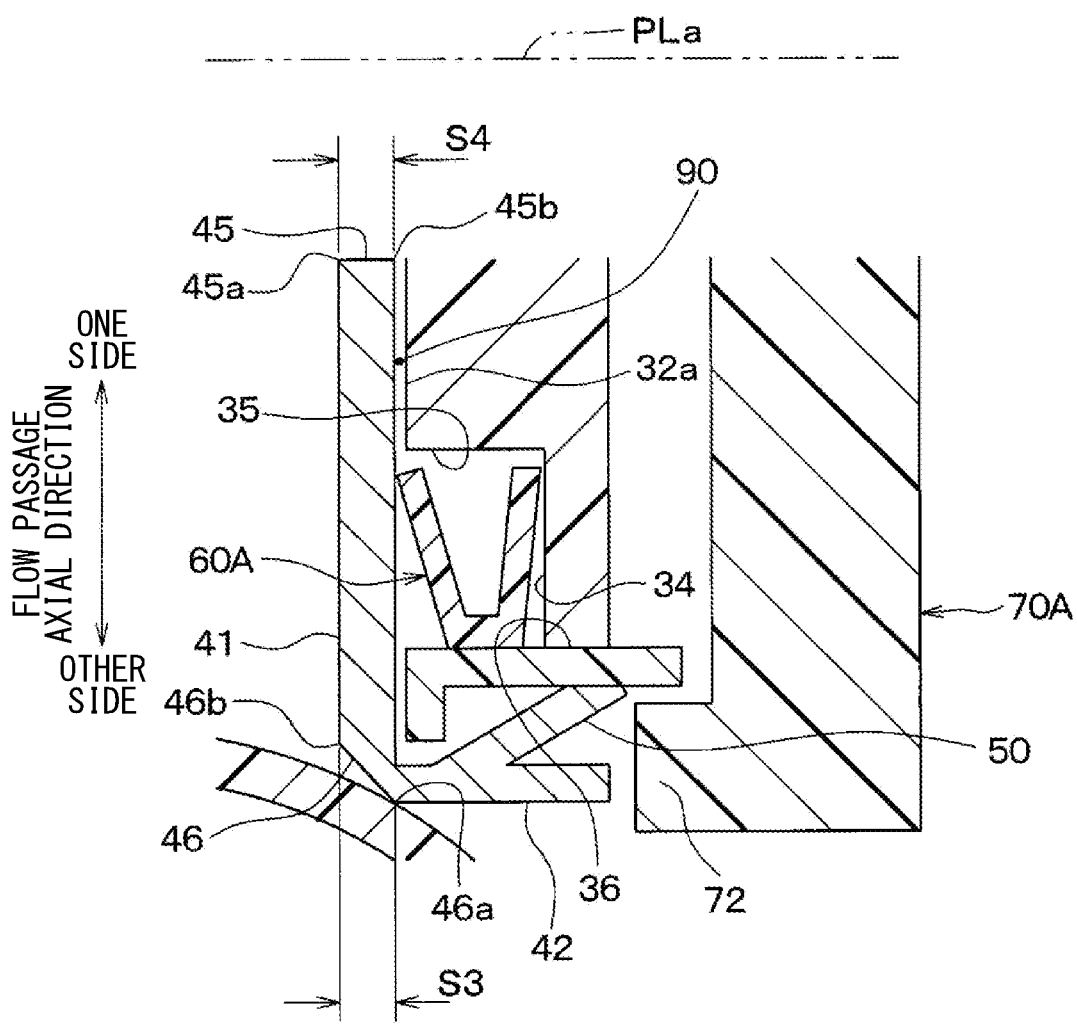
FIG. 8 is an enlarged view of a portion VIII in FIG. 7.

Here, as shown in FIG. 8, a pressure receiving area of a first pressure receiving region 45 of the metal seal 40, which receives a pressure (i.e., a fluid pressure) of the engine coolant from the one side in the flow passage axial direction, is defined as a pressure receiving area S4. An imaginary plane, which is located on the other side of the metal seal 40 in the flow passage axial direction and is perpendicular to the flow passage axis S, is defined as an imaginary plane PLa.

The first pressure receiving region 45 is a region of an end surface of the tubular portion 41 of the metal seal 40 that is located between a radially inner end part 45a and a radially outer end part 45b of the end surface of the tubular portion 41 in the radial direction about the flow passage axis S.

The pressure receiving area S4 of the first pressure receiving region 45 is an area (surface area) of a two-dimensional projected image that is produced by projecting the first pressure receiving region 45 onto the imaginary plane PLa from the other side in the flow passage axial direction. The end surface is an end surface of the tubular portion 41 of the metal seal 40, which is located on the one side in the flow passage axial direction.

Furthermore, a pressure receiving area of a second pressure receiving region 46 of the metal seal 40, which receives a pressure (i.e., a fluid pressure) of the engine coolant from the other side in the flow passage axial direction, is defined as a pressure receiving area S3.

The second pressure receiving region 46 is a region of the flange 42 of the metal seal 40 that is located between: a contact part 46a of the flange 42, which contacts the valve element 10; and a radially inner end part 46b of the flange 42.

Here, this region is an end surface of the tubular portion 41 of the metal seal 40, which is formed on the other side in the flow passage axial direction. This region is a sloped region that is formed such that the sloped region progressively projects toward the one side in the flow passage axial direction as the sloped region extends from the inner side toward the outer side in the radial direction about the flow passage axis S.

The pressure receiving area S3 of the second pressure receiving region 46 is an area (surface area) of a two-dimensional projected image that is produced by projecting the second pressure receiving region 46 onto the imaginary plane PLa from the other side in the flow passage axial direction.

In the present embodiment configured in the above-described manner, the pressure receiving area S4 of the first pressure receiving region 45 is the same size as the pressure receiving area S3 of the second pressure receiving region 46.

The flexible support 50 of the present embodiment is supported by the ring 100, and the flexible support 50 exerts the resilient force thereof to the flange 42 of the metal seal 40.

The packing 60A is provided in place of the packing 60 of the first embodiment. Like the packing 60 of the first embodiment, the packing 60A is placed between the inner peripheral surface 34 of the port 30 and the tubular portion 41 of the metal seal 40. The packing 60A extends in the circumferential direction about the flow passage axis S.

The packing 60A is made of, for example, the rubber and is shaped to have a V-shape in a cross section of the packing 60A such that an opening of the cross section of the packing 60A is directed toward the one side in the flow passage axial direction. The packing 60A is clamped between the inner peripheral surface 34 of the port 30 and the tubular portion 41 of the metal seal 40 in a state where the packing 60A is compressed in the perpendicular direction that is perpendicular to the flow passage axial direction through resiliently deformation of the packing 60A.

Specifically, the packing 60A closely contacts the inner peripheral surface 34 of the port 30 and closely contacts the tubular portion 41 of the metal seal 40. Thereby, the packing 60A seals between the inner peripheral surface 34 of the port 30 and the tubular portion 41 of the metal seal 40.

The port case 70A is shaped in a tubular form that is coaxial with the flow passage axis S. The port case 70A is formed to cover the port 30 from the outer side in the radial direction about the flow passage axis S, which serves as the central axis.

The port case 70A has an opening forming portion 72 that is placed on the other side of the port case 70A in the flow passage axial direction and projects toward the inner side in the radial direction about flow passage axis S to form an opening 71a. The flange 42 of the metal seal 40 and a radially inner side projection 102 of the ring 100 are placed at the inside of the opening 71a of the port case 70A.

The ring 100 has a circular ring plate portion 101 and the radially inner side projection 102. The circular ring plate portion 101 is placed between the end surface 36 of the port 30 and the flexible support 50. The ring 100 is fixed to the end surface 36 of the port 30.

The ring 100 is formed in a ring form about the flow passage axis S. The circular ring plate portion 101 is placed on the outer side of the tubular portion 41 of the metal seal 40 in the radial direction about the flow passage axis S.

The circular ring plate portion 101 is shaped in a plate form that extends in the radial direction about the flow passage axis S. The circular ring plate portion 101 supports a part of the flexible support 50, which is located on the outer side of the flexible support 50 in the radial direction about the flow passage axis S, from the one side in the flow passage axial direction. The circular ring plate portion 101 supports the packing 60 from the other side of the packing 60 in the flow passage axial direction.

Next, the operation of the present embodiment will be described with reference to FIGS. 6 and 7.

First of all, as shown in FIG. 6, in the state where the opening 14 of the valve element 10 is communicated with the opening 31a of the port 30, the engine coolant, which is supplied into the opening 31b of the port 30, flows through the coolant flow passage 31 and the openings 41a, 41b of the metal seal 40.

This engine coolant passes through the opening 31a of the port 30 and flows into the coolant flow passage 12 through the opening 14 of the valve element 10.

The engine coolant, which has passed through the coolant flow passage 12, passes the opening 13 of the valve element 10.

At this time, the packing 60A seals between the inner peripheral surface 34 of the port 30 and the tubular portion 41 of the metal seal 40.

At this time, the flexible support 50 is supported by the ring 100 and supports the flange 42 of the metal seal 40 in the state where the flexible support 50 is compressed in the flow passage axial direction through resilient deformation of the flexible support 50. Therefore, the resilient force of the flexible support 50 is applied to the outer wall 15 of the valve element 10 through the metal seal 40.

Therefore, the appropriate sealing performance of the metal seal 40 relative to the valve element 10 can be ensured.

Thereafter, when the drive device 80 rotates the valve element 10 about the rotational axis T, which serves as the central axis, through the shaft 20, the opening 31a of the port 30 is closed by the closure portion 15a of the outer wall 15 of the valve element 10, as shown in FIG. 7.

For example, when the valve element 10 is displaced toward the one side in the flow passage axial direction, the metal seal 40 is displaced toward the one side in the flow passage axial direction. In response to this displacement, a force is applied from the metal seal 40 to the flexible support 50.

Therefore, the flexible support 50 is resiliently deformed in the flow passage axial direction in the state where the flange 42 of the metal seal 40 closely contacts the closure portion 15a of the valve element 10 while the packing 60 seals between the port 30 and the metal seal 40.

Furthermore, the valve element 10 is displaced toward the other side in the flow passage axial direction. Then, the flexible support 50 expands through resiliently deformation of the flexible support 50. Thus, the resilient force is applied from the flexible support 50 to the metal seal 40.

Thus, the metal seal 40 is displaced toward the other side in the flow passage axial direction. Then, the resilient force is applied from the flexible supports 50a, 50b, 50c to the valve element 10 through the metal seal 40.

Thus, even when the valve element 10 is displaced toward the other side in the flow passage axial direction, it is possible to maintain the state where the flange 42 of the metal seal 40 closely contacts the closure portion 15a of the valve element 10 while the packing 60 seals between the port 30 and the metal seal 40.

When the valve element 10 is displaced in the flow passage axial direction in the above-described manner, the flexible support 50 is resiliently deformed, so that the metal seal 40 closely contacts the closure portion 15a of the valve element 10, and the packing 60 seals between the port 30 and the metal seal 40.

For example, when the valve element 10 is displaced toward the one side in the perpendicular direction that is perpendicular to the flow passage axial direction, a force is applied from the valve element 10 to the metal seal 40 toward the one side in the perpendicular direction that is perpendicular to the flow passage axial direction. As discussed above, the gap 90 is formed between the tubular portion 41 of the metal seal 40 and the inner peripheral surface 32a of the port 30.

Therefore, the metal seal 40 is displaced toward the one side in the perpendicular direction that is perpendicular to the flow passage axial direction in the state where the flange 42 of the metal seal 40 closely contacts the closure portion 15a of the valve element 10.

Thus, a force is applied from the tubular portion 41 of the metal seal 40 to the packing 60 toward the one side in the perpendicular direction that is perpendicular to the flow passage axial direction. As a result, a portion of the packing 60, which is located on the one side of the metal seal 40 in the axial direction of the rotational axis T, is compressed through resilient deformation of this portion of the packing 60. In contrast, the portion of the packing 60, which is located on the other side of the metal seal 40 in the axial direction of the rotational axis T, expands through resilient deformation of this portion of the packing 60.

Therefore, the metal seal 40 is displaced toward the one side in the perpendicular direction that is perpendicular to the flow passage axial direction in the state where the flange 42 of the metal seal 40 closely contacts the closure portion 15a of the valve element 10 while the packing 60 seals between the port 30 and the metal seal 40.

Thereafter, when the valve element 10 is displaced toward the other side in the perpendicular direction that is perpendicular to the flow passage axial direction, a force is applied from the valve element 10 to the metal seal 40 toward the other side in the perpendicular direction that is perpendicular to the flow passage axial direction.

As discussed above, the gap 90 is formed between the tubular portion 41 of the metal seal 40 and the inner peripheral surface 32a of the port 30. Thus, the metal seal 40 is displaced toward the other side in the perpendicular direction that is perpendicular to the flow passage axial direction in the state where the flange 42 of the metal seal 40 closely contacts the closure portion 15a of the valve element 10.

Thus, a force is applied from the tubular portion 41 of the metal seal 40 to the packing 60 toward the other side in the perpendicular direction that is perpendicular to the flow passage axial direction. As a result, the portion of the packing 60, which is located on the other side of the metal seal 40 in the axial direction of the rotational axis T, is compressed through resilient deformation of this portion of the packing 60. In contrast, the portion of the packing 60, which is located on the one side of the metal seal 40 in the axial direction of the rotational axis T, expands through resilient deformation of this portion of the packing 60.

Therefore, the metal seal 40 is displaced toward the other side in the perpendicular direction that is perpendicular to the flow passage axial direction in the state where the flange 42 of the metal seal 40 closely contacts the closure portion 15a of the valve element 10 while the packing 60 seals between the port 30 and the metal seal 40.

When the valve element 10 is displaced in the perpendicular direction that is perpendicular to the flow passage axial direction, or when the valve element 10 is displaced in the flow passage axial direction, the metal seal 40 is urged by the valve element 10 and is thereby displaced in the perpendicular direction that is perpendicular to the flow passage axial direction or is displaced in the flow passage axial direction.

In the present embodiment, the pressure receiving area S4 is the same size as the pressure receiving area S3. Thus, there is no size difference between the pressure receiving area S4 and the pressure receiving area S3. Therefore, in the state where the valve element 10 closes the opening 31a of the port 30, the fluid pressure, which is received by the metal seal 40 from the one side in the flow passage axial direction, and the fluid pressure, which is received by the metal seal 40 from the other side in the flow passage axial direction, can be canceled with each other.

According to the present embodiment discussed above, the control valve includes the port 30 that is shaped in the tubular form about the flow passage axis S while the port 30 forms the coolant flow passage 31 that conducts the engine coolant from the one side toward the other side in the flow passage axial direction.

The control valve includes: the valve element 10, which is placed on the other side of the port 30 in the flow passage axial direction and opens and closes the opening 31a through the rotation of the valve element 10; and the metal seal 40, which contacts the valve element 10.

In the control valve, the gap 90 is formed between the metal seal 40 and the port 30 in the perpendicular direction that is perpendicular to the flow passage axial direction. Thereby, when the valve element 10 is displaced in the perpendicular direction that is perpendicular to the flow passage axial direction, the valve element 10 urges the metal seal 40 to displace the metal seal 40 in the perpendicular direction that is perpendicular to the flow passage axial direction in the state where the metal seal 40 contacts the valve element 10.

Therefore, even when the metal seal 40 is displaced in the perpendicular direction that is perpendicular to the flow passage axial direction, it is possible to maintain the contact state of the metal seal 40 where the metal seal 40 contacts the valve element 10.

Third Embodiment

In the second embodiment, there is described the example where the metal seal 40 is placed on the inner side of the packing 60 in the radial direction about the flow passage axis S. Alternatively, with reference to FIGS. 9, 10 and 11, there will be described a third embodiment, in which the metal seal 40 is placed on the outer side of the packing 60 in the radial direction about the flow passage axis S. An arrow W in FIGS. 9 and 10 indicates a flow direction of the engine coolant.

Figure 9:
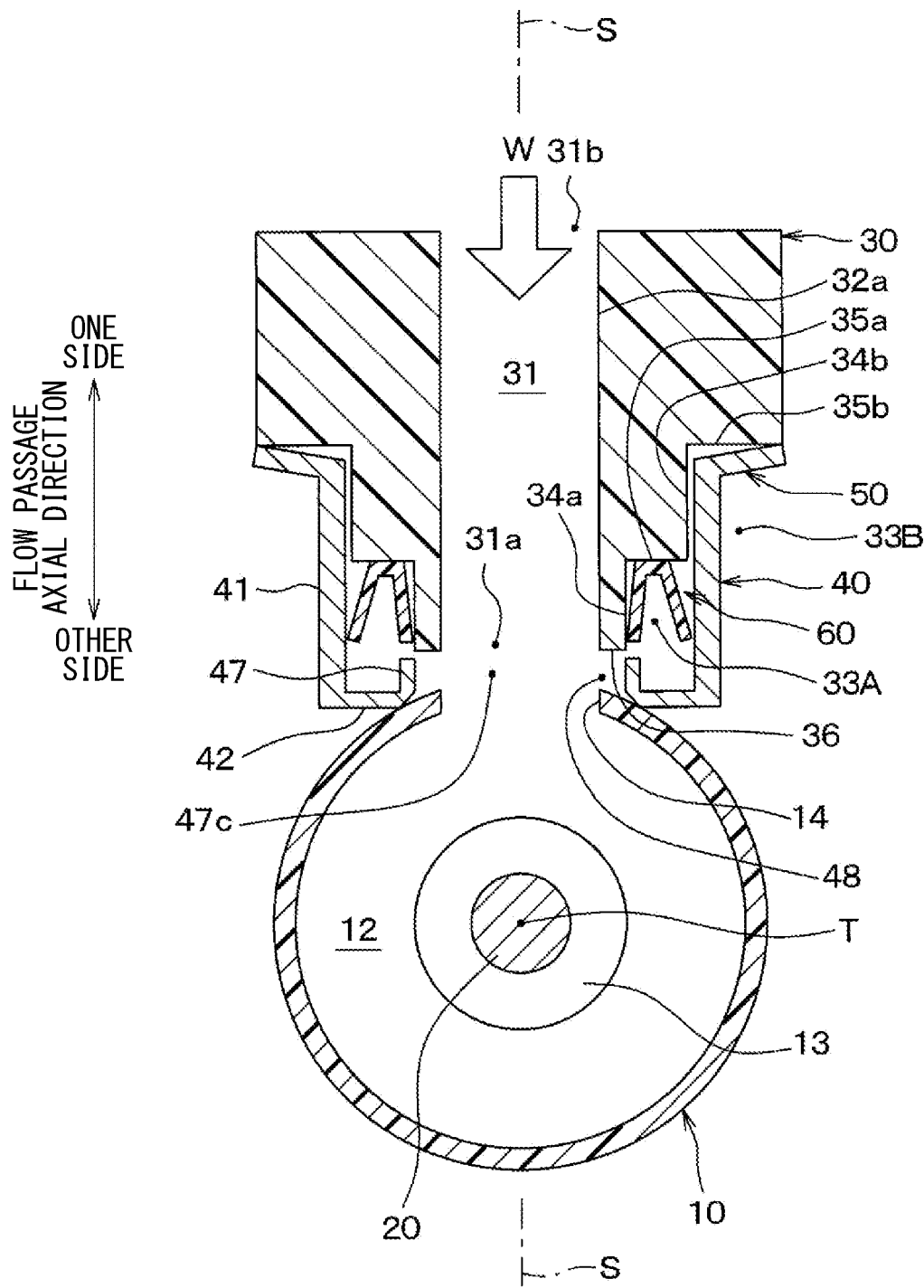
FIG. 9 is a cross-sectional view showing an overall configuration of a control valve according to a third embodiment, indicating a state where an inlet of a valve element and an outlet of a port are communicated with each other.
Figure 10:
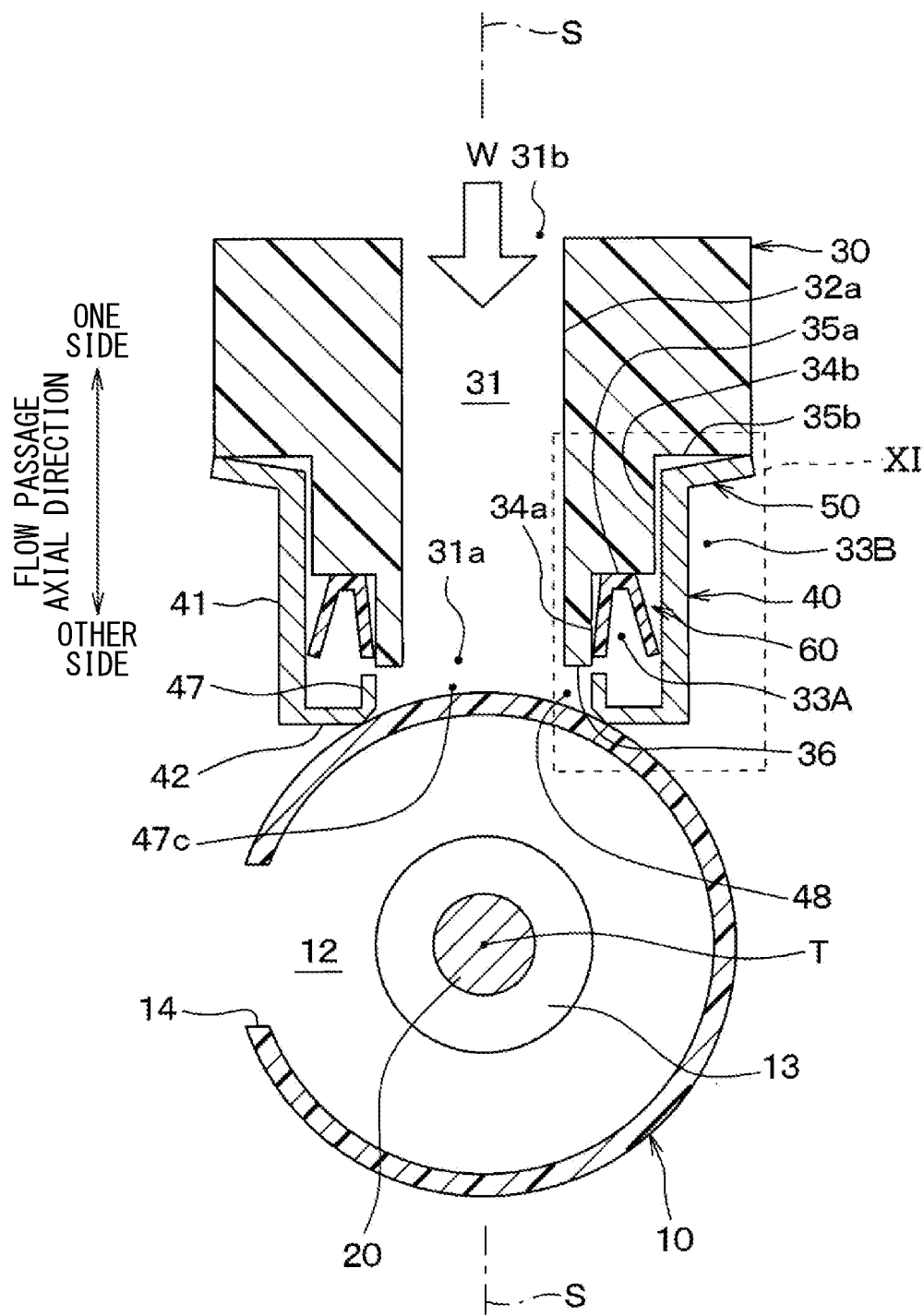
FIG. 10 is a cross-sectional view showing the overall configuration of the control valve according to the third embodiment, indicating a state where the valve element closes the outlet of the port.

Like the control valve of the second embodiment, the control valve of the present embodiment includes the valve element 10, the shaft 20, the packing 60, the casing 70 and the drive device 80. In FIGS. 9 and 10, indication of the casing 70 and the drive device 80 are omitted for the sake of simplicity.

The control valve of the present embodiment differs from the control valve of the second embodiment with respect to the port 30, the metal seal 40 and the flexible support 50. Hereinafter, the port 30, the metal seal 40 and the flexible support 50 of the present embodiment will be described.

The port 30 of the present embodiment has recesses 33A, 33B. The recess 33A is placed on the other side of the port 30 in the flow passage axial direction. The recess 33A opens toward the outer side in the radial direction about the flow passage axis S and also opens toward the other side in the flow passage axial direction.

Specifically, the port 30 has an outer peripheral surface 34*a* and a bottom surface 35*a*, which form the recess 33A. The port 30 also has an outer peripheral surface 34*b* and a bottom surface 35*b*, which form the recess 33B.

The outer peripheral surface 34*a* extends in the circumferential direction about the flow passage axis S. The outer peripheral surface 34*a* is formed to face toward the outer side in the radial direction about the flow passage axis S.

The outer peripheral surface 34*b* extends in the circumferential direction about the flow passage axis S. The outer peripheral surface 34*b* is formed to face toward the outer side in the radial direction about the flow passage axis S. The outer peripheral surface 34*b* is located on the outer side of the outer peripheral surface 34*a* in the radial direction about the flow passage axis S.

In the present embodiment, the gap 90 is formed between the outer peripheral surface 34*b* of the port 30 and the tubular portion 41. The gap 90 extends all around in the circumferential direction about the flow passage axis S.

The bottom surface 35*a* is located between the outer peripheral surface 34*a* and the outer peripheral surface 34*b* in the flow passage axial direction. The bottom surface 35*a* extends in the circumferential direction about the flow passage axis S. The bottom surface 35*a* faces toward the other side in the flow passage axial direction.

The bottom surface 35*b* is located on the one side of the outer peripheral surfaces 34*a*, 34*b* in the flow passage axial direction. The bottom surface 35*b* is located on the outer side of the outer peripheral surface 34*b* in the radial direction about the flow passage axis S. The bottom surface 35*b* extends in the circumferential direction about the flow passage axis S. The bottom surface 35*b* faces toward the other side in the flow passage axial direction.

The metal seal 40 includes the tubular portion 41, the flange 42 and a projection 47. The tubular portion 41 is located on the outer side of the outer peripheral surfaces 34*a*, 34*b* in the radial direction about the flow passage axis S. The tubular portion 41 is shaped in a tubular form about the flow passage axis S, which serves as the central axis.

The flange 42 is located on the other side of the tubular portion 41 in the flow passage axial direction. The flange 42 extends inward in the radial direction about the flow passage axis S from the end part of the tubular portion 41, which is located on the other side in the flow passage axial direction. The flange 42 is shaped in a circular ring form that is coaxial with the flow passage axis S.

The projection 47 is located at the inner side of the flange 42 in the radial direction about the flow passage axis S. The projection 47 projects from an end part of the flange 42, which is located on the inner side in the radial direction about the flow passage axis S, toward the one side in the flow passage axial direction. The projection 47 extends all around in the circumferential direction about the flow passage axis S.

The projection 47 of the present embodiment forms an opening 47*c* that opens in the flow passage axial direction. The projection 47 forms a space 48 between the projection 47 and the end surface 36 of the port 30, which is located on the other side in the flow passage axial direction. The space 48 is configured to conduct the engine coolant through the space 48 from the coolant flow passage 31 toward the one side of the metal seal 40 in the flow passage axial direction.

Figure 11:
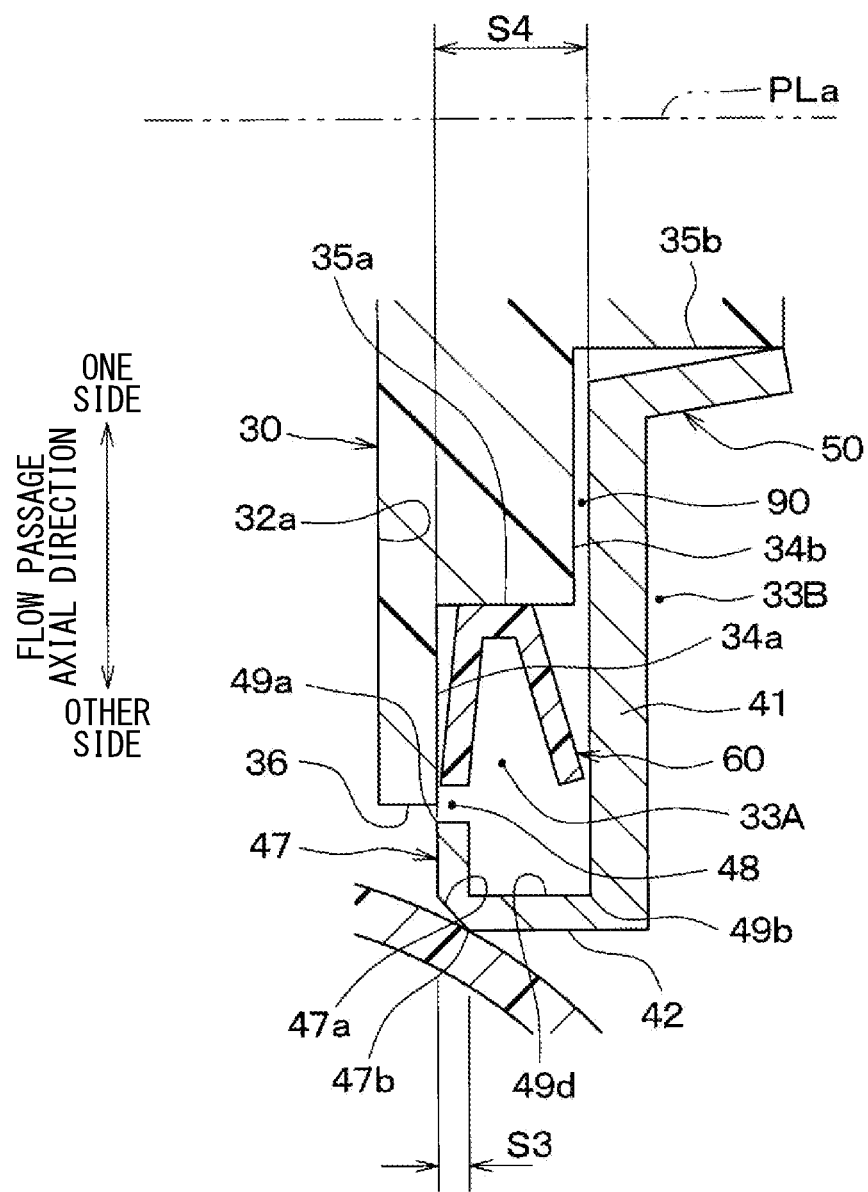
FIG. 11 is an enlarged view of a portion XI in FIG. 10.

Here, as shown in FIG. 11, a pressure receiving area of a first pressure receiving region 49*d* of the metal seal 40, which receives a pressure (i.e., a fluid pressure) of the engine coolant from the one side in the flow passage axial direction, is defined as a pressure receiving area S4. An imaginary plane, which is located on the one side of the metal seal 40 in the flow passage axial direction and is perpendicular to the flow passage axis S, is defined as an imaginary plane PLa.

The first pressure receiving region 49*d* is a region of the flange 42 that is located between a radially inner end part 49*a* of the flange 42 and a radially outer end part 49*b* of the flange 42 on the one side in the flow passage axial direction. The pressure receiving area S4 is an area (surface area) of a two-dimensional projected image that is produced by projecting the first pressure receiving region 49*d* onto the imaginary plane PLa from the other side in the flow passage axial direction.

Furthermore, a pressure receiving area of a second pressure receiving region 47*a* of the metal seal 40, which receives a pressure (i.e., a fluid pressure) of the engine coolant from the other side in the flow passage axial direction, is defined as a pressure receiving area S3. The second pressure receiving region 47*a* is a region of the flange 42 that is located between: a radially inner end part 49*a* of the flange 42; and a contact part 47*b* of the flange 42, which contacts the valve element 10.

The second pressure receiving region 47*a* is formed at a part of the projection 47, which is located on the other side in the flow passage axial direction. The second pressure receiving region 47*a* is a sloped region that is formed such that the sloped region progressively projects toward the other side in the flow passage axial direction as the sloped region extends from the inner side toward the outer side in the radial direction about the flow passage axis S.

The pressure receiving area S3 is an area (surface area) of a two-dimensional projected image that is produced by projecting the second pressure receiving region 47a onto the imaginary plane PLa from the other side in the flow passage axial direction.

In the present embodiment, the pressure receiving area S4 of the first pressure receiving region 49d is larger than the pressure receiving area S3 of the second pressure receiving region 47a.

The flexible support 50 is provided in place of the flexible supports 50a, 50b, 50c of the first embodiment. The flexible support 50 is placed between the tubular portion 41 of the metal seal 40 and the bottom surface 35b of the port 30. The flexible support 50 is shaped in a circular ring form about the flow passage axis S and functions as a coned-disc spring. The flexible support 50 is formed such that the flexible support 50 progressively projects toward the one side in the flow passage axial direction as the flexible support 50 extends from the inner side toward the outer side in the radial direction about the flow passage axis S.

The flexible support 50 is supported by the bottom surface 35b of the port 30 and applies the resilient force to the tubular portion 41 of the metal seal 40 toward the other side in the flow passage axial direction. The metal seal 40 and the flexible support 50 of the present embodiment are made of a metal material and are formed integrally in one-piece.

The packing 60 of the present embodiment is placed between the outer peripheral surface 34a of the port 30 and the tubular portion 41 of the metal seal 40. The packing 60 closely contacts the outer peripheral surface 34a of the port 30 and also closely contacts the tubular portion 41 of the metal seal 40.

Thereby, the packing 60 seals between the outer peripheral surface 34a of the port 30 and the tubular portion 41 of the metal seal 40.

Next, the operation of the present embodiment will be described with reference to FIGS. 9 and 10.

First of all, as shown in FIG. 9, in the state where the opening 14 of the valve element 10 is communicated with the opening 31a of the port 30, the engine coolant, which is supplied into the opening 31b of the port 30, flows through the coolant flow passage 31 and the opening 47c of the metal seal 40.

This engine coolant passes through the opening 31a of the port 30 and flows into the coolant flow passage 12 through the opening 14 of the valve element 10.

The engine coolant, which has passed through the coolant flow passage 12, passes the opening 13 of the valve element 10 and flows into the coolant passage 71.

At this time, the packing 60 seals between the outer peripheral surface 34a of the port 30 and the tubular portion 41 of the metal seal 40.

In this state, the flexible support 50 is supported by the bottom surface 35b of the port 30 and supports the tubular portion 41 of the metal seal 40 in the state where the flexible support 50 is compressed in the flow passage axial direction through resilient deformation of the flexible support 50. Therefore, the resilient force of the flexible support 50 is applied to the outer wall 15 of the valve element 10 through the metal seal 40.

Thus, the contact part 47b of the sloped surface of the metal seal 40 closely contacts the valve element 10. Therefore, the appropriate sealing performance of the metal seal 40 relative to the valve element 10 can be ensured.

Thereafter, when the drive device 80 rotates the valve element 10 about the rotational axis T, which serves as the central axis, through the shaft 20, the opening 31a of the port 30 is closed by the closure portion 15a of the outer wall 15 of the valve element 10, as shown in FIG. 10.

For example, when the valve element 10 is displaced toward the one side in the flow passage axial direction, the metal seal 40 is displaced toward the one side in the flow passage axial direction. In response to this displacement, a force is applied from the metal seal 40 to the flexible support 50.

Therefore, the flexible support 50 is resiliently deformed in the flow passage axial direction in the state where the flange 42 of the metal seal 40 closely contacts the closure portion 15a of the valve element 10 while the packing 60 seals between the port 30 and the metal seal 40.

Furthermore, the valve element 10 may be displaced toward the other side in the flow passage axial direction. Then, the flexible support 50 expands through resiliently deformation of the flexible support 50. Thus, the resilient force is applied from the flexible support 50 to the metal seal 40.

Thus, the metal seal 40 is displaced toward the other side in the flow passage axial direction. Then, the resilient force is applied from the flexible support 50 to the valve element 10 through the metal seal 40.

Thus, even when the valve element 10 is displaced toward the other side in the flow passage axial direction, it is possible to maintain the state where the flange 42 of the metal seal 40 closely contacts the closure portion 15a of the valve element 10 while the packing 60 seals between the port 30 and the metal seal 40.

When the valve element 10 is displaced in the flow passage axial direction in the above-described manner, the flexible support 50 is resiliently deformed, so that the metal seal 40 closely contacts the closure portion 15a of the valve element 10, and the packing 60 seals between the port 30 and the metal seal 40.

For example, when the valve element 10 is displaced toward the one side in the perpendicular direction that is perpendicular to the flow passage axial direction, a force is applied from the valve element 10 to the metal seal 40 toward the one side in the perpendicular direction that is perpendicular to the flow passage axial direction. As discussed above, the gap 90 is formed between the tubular portion 41 of the metal seal 40 and the outer peripheral surface 34b of the port 30.

Therefore, the metal seal 40 is displaced toward the one side in the perpendicular direction that is perpendicular to the flow passage axial direction in the state where the flange 42 of the metal seal 40 closely contacts the closure portion 15a of the valve element 10.

Thus, a force is applied from the tubular portion 41 of the metal seal 40 to the packing 60 toward the one side in the perpendicular direction that is perpendicular to the flow passage axial direction. As a result, a portion of the packing 60, which is located on the one side of the metal seal 40 in the axial direction of the rotational axis T, is compressed through resilient deformation of this portion of the packing 60. In contrast, a portion of the packing 60, which is located on the other side of the metal seal 40 in the axial direction of the rotational axis T, expands through resilient deformation of this portion of the packing 60.

Therefore, the metal seal 40 is displaced toward the one side in the perpendicular direction that is perpendicular to the flow passage axial direction in the state where the flange 42 of the metal seal 40 closely contacts the closure portion 15a of the valve element 10 while the packing 60 seals between the port 30 and the metal seal 40.

Thereafter, when the valve element 10 is displaced toward the other side in the perpendicular direction that is perpendicular to the flow passage axial direction, a force is applied from the valve element 10 to the metal seal 40 toward the other side in the perpendicular direction that is perpendicular to the flow passage axial direction. As discussed above, the gap 90 is formed between the tubular portion 41 of the metal seal 40 and the outer peripheral surface 34*b* of the port 30.

Therefore, the metal seal 40 is displaced toward the other side in the perpendicular direction that is perpendicular to the flow passage axial direction in the state where the flange 42 of the metal seal 40 closely contacts the closure portion 15*a* of the valve element 10.

Thus, a force is applied from the tubular portion 41 of the metal seal 40 to the packing 60 toward the other side in the perpendicular direction that is perpendicular to the flow passage axial direction. As a result, the portion of the packing 60, which is located on the other side of the metal seal 40 in the axial direction of the rotational axis T, is compressed through resilient deformation of this portion of the packing 60. In contrast, the portion of the packing 60, which is located on the one side of the metal seal 40 in the axial direction of the rotational axis T, expands through resilient deformation of this portion of the packing 60.

Thus, the metal seal 40 is displaced toward the other side in the perpendicular direction that is perpendicular to the flow passage axial direction in the state where the contact part 47*b* of the sloped surface of the metal seal 40 closely contacts the closure portion 15*a* of the valve element 10 while the packing 60 seals between the port 30 and the metal seal 40.

When the valve element 10 is displaced in the perpendicular direction that is perpendicular to the flow passage axial direction, or when the valve element 10 is displaced in the flow passage axial direction, the metal seal 40 is urged by the valve element 10 and is thereby displaced in the perpendicular direction that is perpendicular to the flow passage axial direction or is displaced in the flow passage axial direction.

In the present embodiment, the pressure receiving area S4 is larger than the pressure receiving area S3. Therefore, in the state where the valve element 10 closes the opening 31*a* of the port 30, a fluid pressure, which is generated based on a difference between the pressure receiving area S4 and the pressure receiving area S3, is applied from the sloped surface of the metal seal 40 to the closure portion 15*a* of the outer wall 15 of the valve element 10. Thus, the sealing performance of the metal seal 40 relative to the valve element 10 can be improved.

According to the present embodiment discussed above, the control valve includes the port 30 that is shaped in the tubular form about the flow passage axis S while the port 30 forms the coolant flow passage 31 that conducts the engine coolant from the one side toward the other side in the flow passage axial direction.

The control valve includes: the valve element 10, which is placed on the other side of the port 30 in the flow passage axial direction and opens and closes the opening 31*a* through the rotation of the valve element 10; and the metal seal 40, which contacts the valve element 10.

In the control valve, the gap 90 is formed between the tubular portion 41 of the metal seal 40 and the outer peripheral surface 34*b* of the port 30 in the perpendicular direction that is perpendicular to the flow passage axial direction. Thereby, when the valve element 10 is displaced in the perpendicular direction that is perpendicular to the flow passage axial direction, the valve element 10 urges the metal seal 40 to displace the metal seal 40 in the perpen-dicular direction that is perpendicular to the flow passage axial direction in the state where the metal seal 40 contacts the valve element 10.

Thus, the metal seal 40 is urged by the valve element 10 in the state where the metal seal 40 contacts the valve element 10, so that the metal seal 40 is displaced in the perpendicular direction that is perpendicular to the flow passage axial direction. Therefore, even when the metal seal 40 is displaced in the perpendicular direction that is perpendicular to the flow passage axial direction, it is possible to maintain the contact state of the metal seal 40 where the metal seal 40 contacts the valve element 10.

Other Embodiments (1) In the first, second and third embodiments, there is described the example where the control valve is configured to open and close the engine coolant circuit. Alternatively, the control valve may be configured to open and close a gas flow passage. Further alternatively, the control valve may be configured to open and close a flow passage that conducts liquid, which is other than the engine coolant.

(2) In the first, second and third embodiments, the metal seal 40 and the flexible supports 50*a*, 50*b*, 50*c* are formed integrally in one-piece. Alternative to this, the following modifications (a), (b) may be adapted.

Figure 12:
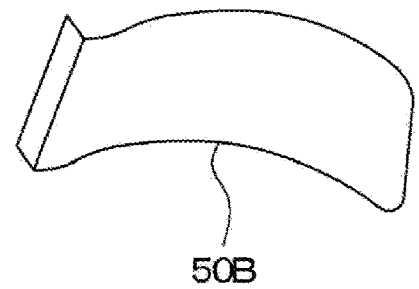
FIG. 12 is a perspective view of a flexible support of a control valve according to another embodiment.
Figure 13:
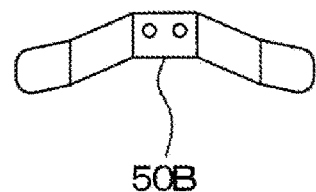
FIG. 13 is a perspective view of a flexible support of a control valve according to another embodiment.

(a) The metal seal 40 may be formed separately from the flexible supports 50*a*, 50*b*, 50*c*. For example, a leaf spring shown in FIG. 12 may be used as a flexible support 50B. Alternatively, a leaf spring shown in FIG. 13 may be used as the flexible support 50B.

(b) In the third embodiment described above, a flexible support 50C shown in FIG. 14 may be used in place of the flexible support 50.

Figure 14:
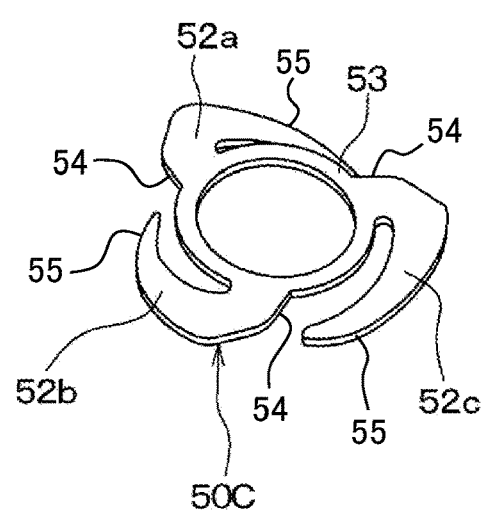
FIG. 14 is a perspective view of a flexible support of a control valve according to another embodiment.

The flexible support 50C shown in FIG. 14 has a ring 53 and legs 52*a*, 52*b*, 52*c*.

The ring 53 is shaped in a circular ring form about the flow passage axis S. The ring 53 supports the tubular portion 41 of the metal seal 40 from the one side in the flow passage axial direction. The legs 52*a*, 52*b*, 52*c* are located on the outer side of the ring 53 in the radial direction about the flow passage axis S. The legs 52*a*, 52*b*, 52*c* are arranged at equal intervals in the circumferential direction about the flow passage axis S.

Each of the legs 52*a*, 52*b*, 52*c* includes: a projection 54, which projects outward in the radial direction from the ring 53; and an extension 55, which extends from a distal end of the projection 54 in the circumferential direction about the flow passage axis S.

The extension 55 is formed such that the extension 55 progressively projects toward the one side in the flow passage axial direction as the extension 55 extends further away from the distal end of the projection 54 in the circum-ferential direction. A circumferential distal end side of the extension 55 is supported by the bottom surface 35*b* of the port 30.

The legs 52*a*, 52*b*, 52*c* respectively exert a resilient force against the metal seal 40. Therefore, the resilient force of the flexible support 50C is applied to the valve element 10 through the metal seal 40.

Figure 15:
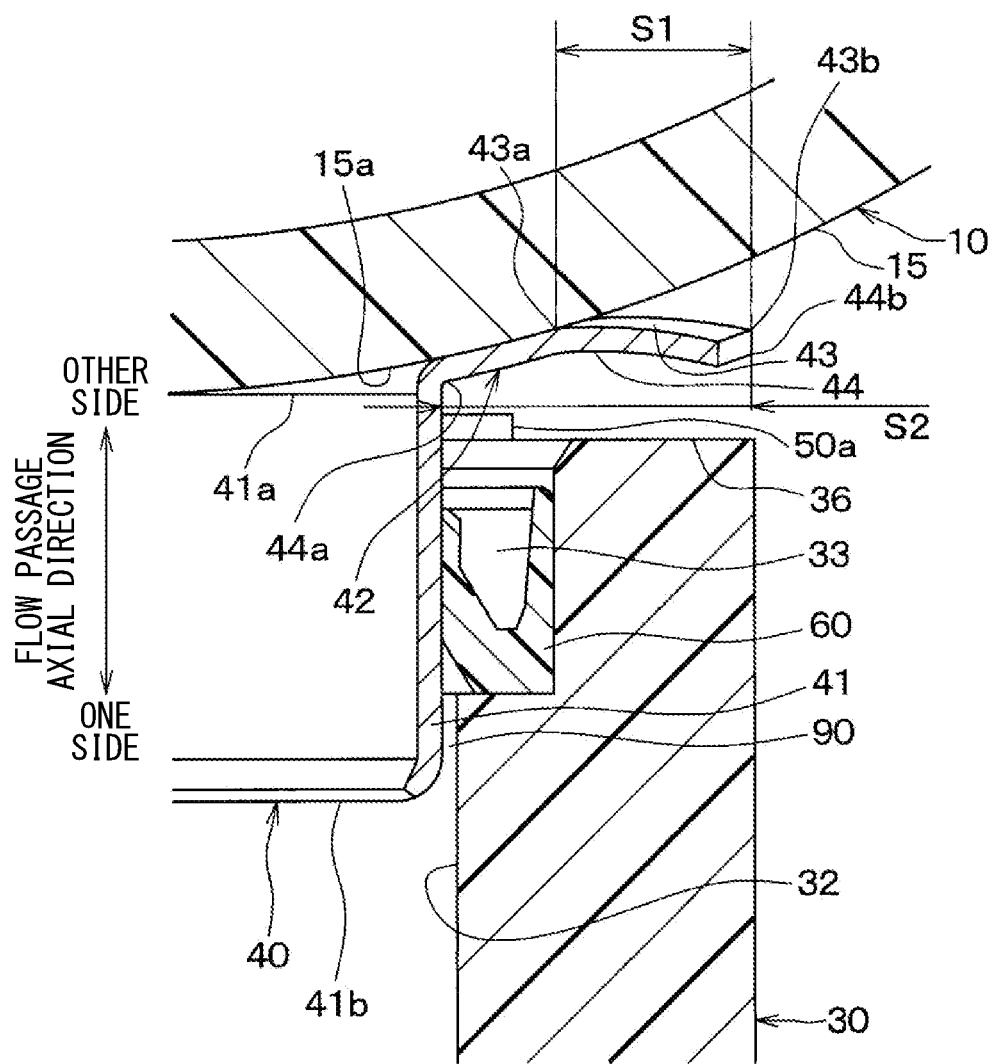
FIG. 15 is a partial enlarged view of a flexible support of a control valve and its periphery according to another embodiment indicating a case where a pressure receiving area S2 is larger than a pressure receiving area S1.

(3) In the first embodiment, there is described the example where the pressure receiving area S1 is the same size as the pressure receiving area S2. Alternatively, as shown in FIG. 15, the pressure receiving area S2 may be larger than the pressure receiving area S1.

In such case, a fluid pressure, which is generated based on a difference between a fluid pressure applied to the second pressure receiving region 43 and a fluid pressure applied to the first pressure receiving region 44, is applied from the flange 42 of the metal seal 40 to the closure portion 15a of the outer wall 15 of the valve element 10.

In this case, a radial size between the contact part 43a of the flange 42 for contacting with the valve element 10 and the radially outer end part 43b of the flange 42 needs to be reduced in comparison to that of the first embodiment.

Here, the first pressure receiving region 44 is the region of the back surface of the flange 42 that is located between the radially inner end part 44a and the radially outer end part 44b of the back surface of the flange 42. The pressure receiving area S2 of the first pressure receiving region 44 is an area (surface area) of a two-dimensional projected image that is produced by projecting the first pressure receiving region 44 onto the imaginary plane PLa (see FIG. 4) from the one side in the flow passage axial direction.

The second pressure receiving region 43 is a region of the front surface of the flange 42 that is located between: the contact part 43a of the front surface of the flange 42, which contacts the valve element 10; and a radially outer end part 43b of the front surface of the flange 42. The pressure receiving area S1 of the second pressure receiving region 43 is an area (surface area) of a two-dimensional projected image that is produced by projecting the second pressure receiving region 43 onto the imaginary plane PLa from the one side in the flow passage axial direction.

(4) In the first and second embodiments, the gap 90 is located between the tubular portion 41 of the metal seal 40 and the inner peripheral surface 32, 32a of the port 30 in the perpendicular direction that is perpendicular to the flow passage axial direction. Furthermore, in the third embodiment, the gap 90 is located between the tubular portion 41 of the metal seal 40 and the outer peripheral surface 34b of the port 30 in the perpendicular direction that is perpendicular to the flow passage axial direction.

Alternatively, as long as the gap 90 is located between the tubular portion 41 of the metal seal 40 and the inner peripheral surface 32, 32a or the outer peripheral surface 34b of the port 30 in a crossing direction, which crosses the flow passage axial direction, this crossing direction may be any crossing direction that is other than the perpendicular direction that is perpendicular to the flow passage axial direction.

(5) In the first, second and third embodiments, there is described the example where the port 30 is placed on the one side of the valve element 10 in the flow passage axial direction. Alternatively, the port 30 may be placed on the other side of the valve element 10 in the flow passage axial direction.

(6) The present disclosure is not necessarily limited to the above embodiments, and the above embodiments may be appropriately modified within the scope of the present disclosure. Further, the above embodiments are not unrelated to each other and can be appropriately combined unless such a combination is obviously impossible. In each of the above embodiments, it is needless to say that the elements constituting the embodiment are not necessarily essential, unless otherwise clearly indicated as essential or in principle considered to be clearly essential. In each of the above embodiments, when a numerical value such as the number, numerical value, amount, range or the like of the constituent elements of the exemplary embodiment is mentioned, the present disclosure should not be limited to such a numerical value unless it is clearly stated that it is essential and/or it is required in principle. In each of the above embodiments, when referring to the shape, the positional relationship or the like of the components, the present disclosure should not be limited to such a shape, positional relationship or the like unless it is clearly stated that it is essential and/or it is required in principle.

Conclusion

According to a first aspect recited in the first, second and third embodiments and the other embodiments, a control valve includes: a flow passage forming portion; a valve element; and a seal that contacts the valve element.

The flow passage forming portion is shaped in a tubular form and forms a flow passage while the flow passage is configured to conduct fluid in an axial direction of a central axis of the flow passage forming portion. The flow passage forming portion forms an opening of the flow passage that opens in the axial direction.

The valve element is placed relative to the flow passage forming portion in the axial direction. The valve element is configured to open and close the opening of the flow passage forming portion through rotation of the valve element.

A gap is formed between the seal and the flow passage forming portion in a crossing direction, which crosses the axial direction, to enable displacement of the seal in the crossing direction in a state where the seal contacts the valve element.

According to a second aspect, the control valve includes a support that is supported by the flow passage forming portion and is configured to exert a resilient force to urge the seal against the valve element.

In this way, the sealing performance of the seal relative to the valve element can be improved.

According to a third aspect, the flow passage forming portion is located on one side of the valve element in the axial direction. In a case where the fluid is conducted from the valve element into the flow passage of the flow passage forming portion through the opening of the flow passage forming portion, a pressure receiving area of a first pressure receiving region of the seal is the same size as a pressure receiving area of a second pressure receiving region of the seal.

Therefore, the pressure, which is applied to the first pressure receiving region, and the pressure, which is applied to the second pressure receiving region, can be canceled with each other.

Here, the first pressure receiving region is defined as a region of the seal, which receives the pressure of the fluid from one side of the seal in the axial direction. The second pressure receiving region is defined as a region of the seal, which receives the pressure of the fluid from another side of the seal in the axial direction. An imaginary plane is defined as an imaginary plane that is located on the another side (or the one side) and is perpendicular to the central axis.

The pressure receiving area of the first pressure receiving region is defined as an area (surface area) of a two-dimensional projected image that is produced by projecting the first pressure receiving region onto the imaginary plane from the one side (or the another side) in the axial direction. The pressure receiving area of the second pressure receiving region is defined as an area (surface area) of a two-dimensional projected image that is produced by projecting the second pressure receiving region onto the imaginary plane from the one side (or the another side) in the axial direction.

According to a fourth aspect, the flow passage forming portion is located on one side of the valve element in the axial direction. In a case where the fluid is conducted from the valve element into the flow passage of the flow passage forming portion through the opening of the flow passage forming portion, a pressure receiving area of a first pressure receiving region of the seal is larger than a pressure receiving area of a second pressure receiving region of the seal.

Therefore, the seal can be urged against the valve element according to a difference between a pressure applied to the first pressure receiving region and a pressure applied to the second pressure receiving region. Therefore, the sealing performance of the seal relative to the valve element can be improved.

According to a fifth aspect, the flow passage forming portion is located on one side of the valve element in the axial direction. In a case where the fluid is conducted from the flow passage of the flow passage forming portion toward the valve element through the opening of the flow passage forming portion, a pressure receiving area of a first pressure receiving region of the seal is the same size as a pressure receiving area of a second pressure receiving region of the seal.

Therefore, the pressure, which is applied to the first pressure receiving region, and the pressure, which is applied to the second pressure receiving region, can be canceled with each other.

According to a sixth aspect, the flow passage forming portion is located on one side of the valve element in the axial direction. In a case where the fluid is conducted from the flow passage of the flow passage forming portion toward the valve element through the opening of the flow passage forming portion, a pressure receiving area of a first pressure receiving region of the seal is larger than a pressure receiving area of a second pressure receiving region of the seal.

Therefore, the seal can be urged against the valve element according to a difference between a pressure applied to the first pressure receiving region and a pressure applied to the second pressure receiving region. Therefore, the sealing performance of the seal relative to the valve element can be improved.

According to a seventh aspect, the control valve includes a packing that is placed between the flow passage forming portion and the seal in the crossing direction. The packing is configured to be compressed through resilient deformation of the packing and thereby seal between the flow passage forming portion and the seal.

In this way, the appropriate sealing performance for sealing between the flow passage forming portion and the seal can be ensured.

What is claimed is:

1. A control valve comprising:
   a flow passage forming portion that is shaped in a tubular form and has a flow passage at an inside of the flow passage forming portion while the flow passage is configured to conduct fluid in an axial direction of a central axis of the flow passage forming portion, wherein an opening of the flow passage opens in the axial direction at the flow passage forming portion;
   a valve element that is placed relative to the flow passage forming portion in the axial direction, wherein the valve element is configured to open and close the opening of the flow passage forming portion through rotation of the valve element;
   a seal that is metal and directly contacts the valve element, wherein a gap is present between the seal and the flow passage forming portion in a crossing direction, which crosses the axial direction, to enable displacement of the seal in the crossing direction in a state where the seal contacts the valve element; and
   a support that is metal and is integrated with the seal in one-piece, wherein the support is supported by the flow passage forming portion in the axial direction and is configured to exert a resilient force to urge the seal against the valve element, wherein:
   the seal includes a tubular portion and a flange while the flange extends outward in a radial direction about an axis of the tubular portion from an end part of the tubular portion which is adjacent to the valve element;
   the support includes a projection that projects from the flange towards the flow passage forming portion; and
   the gap is present between the tubular portion and the flow passage forming portion in the crossing direction.

2. The control valve according to claim 1, wherein:
   the flow passage forming portion is located on one side of the valve element in the axial direction; and
   in a case where the fluid is conducted from the valve element into the flow passage of the flow passage forming portion through the opening of the flow passage forming portion, a pressure receiving area of a first pressure receiving region of the seal, which receives a pressure of the fluid from one side of the seal in the axial direction, is the same size as a pressure receiving area of a second pressure receiving region of the seal, which receives a pressure of the fluid from another side of the seal in the axial direction.

3. The control valve according to claim 1, wherein:
   the flow passage forming portion is located on one side of the valve element in the axial direction; and
   in a case where the fluid is conducted from the valve element into the flow passage of the flow passage forming portion through the opening of the flow passage forming portion, a pressure receiving area of a first pressure receiving region of the seal, which receives a pressure of the fluid from one side of the seal in the axial direction, is larger than a pressure receiving area of a second pressure receiving region of the seal, which receives a pressure of the fluid from another side of the seal in the axial direction.

4. The control valve according to claim 1, wherein:
   the flow passage forming portion is located on one side of the valve element in the axial direction; and
   in a case where the fluid is conducted from the flow passage of the flow passage forming portion toward the valve element through the opening of the flow passage forming portion, a pressure receiving area of a first pressure receiving region of the seal, which receives a pressure of the fluid from one side of the seal in the axial direction, is the same size as a pressure receiving area of a second pressure receiving region of the seal, which receives a pressure of the fluid from another side of the seal in the axial direction.

5. The control valve according to claim 1, wherein:
   the flow passage forming portion is located on one side of the valve element in the axial direction; and
   in a case where the fluid is conducted from the flow passage of the flow passage forming portion toward the valve element through the opening of the flow passage forming portion, a pressure receiving area of a first pressure receiving region of the seal, which receives a pressure of the fluid from one side of the seal in the axial direction, is larger than a pressure receiving area of a second pressure receiving region of the seal, which receives a pressure of the fluid from another side of the seal in the axial direction.

6. The control valve according to claim 1, comprising a packing that is placed between the flow passage forming portion and the seal in the crossing direction, wherein the packing is configured to be compressed through resilient deformation of the packing and thereby seal between the flow passage forming portion and the seal.

7. The control valve according to claim 1, wherein:
the projection is one of a plurality of projections; and
the plurality of projections respectively project from a plurality of locations of the flange arranged in a circumferential direction about the axis.

* * * * *